US010791325B2

(12) United States Patent
Lu et al.

(10) Patent No.: US 10,791,325 B2
(45) Date of Patent: Sep. 29, 2020

(54) METHOD AND SYSTEM FOR MONITORING EQUIPMENT STATE

(71) Applicant: Wistron Corp., New Taipei (TW)

(72) Inventors: Yu Bo Lu, New Taipei (TW); Wenyu Bao, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/504,163

(22) Filed: Jul. 5, 2019

(65) Prior Publication Data

US 2020/0260069 A1 Aug. 13, 2020

(30) Foreign Application Priority Data

Feb. 12, 2019 (CN) .......................... 2019 1 0111049

(51) Int. Cl.
| | |
|---|---|
| *H04N 7/18* | (2006.01) |
| *H04N 17/00* | (2006.01) |
| *G06F 3/0481* | (2013.01) |
| *H04L 12/24* | (2006.01) |
| *H04N 5/232* | (2006.01) |
| *H04L 29/08* | (2006.01) |

(52) U.S. Cl.
CPC ....... *H04N 17/002* (2013.01); *G06F 3/04817* (2013.01); *H04L 41/069* (2013.01); *H04L 41/0686* (2013.01); *H04N 5/23206* (2013.01); *H04L 67/12* (2013.01)

(58) Field of Classification Search
CPC .... H04N 7/18; H04N 17/002; H04N 5/23206; G06F 3/04817; H04L 41/0686; H04L 41/069; H04L 67/12

USPC ........................................ 348/143, 159, 187
See application file for complete search history.

(56) References Cited

U.S. PATENT DOCUMENTS

| | | | |
|---|---|---|---|
| 7,172,113 B2 * | 2/2007 | Olenick | ................... G07F 17/26 235/380 |
| 9,463,574 B2 * | 10/2016 | Purkayastha | .......... B25J 9/1697 |
| 10,205,867 B2 * | 2/2019 | Shibahara | ................ H04N 5/04 |
| 2002/0097322 A1 | 7/2002 | Monroe et al. | |
| 2015/0022630 A1 | 1/2015 | Shafir | |
| 2018/0189714 A1 * | 7/2018 | Azpitarte | ............... G08B 21/14 |

\* cited by examiner

*Primary Examiner* — Trang U Tran

(57) ABSTRACT

A method for monitoring equipment state includes the following steps. At least one input is received to generate a configuration file including an equipment identifier, a photographing equipment address and a photographing angle code. The equipment identifier, the photographing equipment address and the photographing viewing angle code are associated according to the configuration file. An abnormal signal having the equipment identifier is received. The photographing equipment address and the photographing viewing angle code corresponding to the equipment identifier are obtained according to the abnormal signal. The photographing viewing angle code is transmitted to a photographer corresponding to the photographing equipment address through a communication channel. The photographer photographs the equipment that corresponds to the equipment identifier according to the photographing viewing angle code, so as to generate a monitoring image. The monitoring image is displayed on display equipment. The method may effectively increase the flexibility and timeliness of factory monitoring.

18 Claims, 15 Drawing Sheets

METHOD AND SYSTEM FOR MONITORING EQUIPMENT STATE

CROSS REFERENCE TO RELATED APPLICATIONS

This application claims priority of China Patent Application No. 201910111049.7, filed on Feb. 12, 2019, the entirety of which is incorporated by reference herein.

BACKGROUND OF THE INVENTION

Field of the Invention

The present invention relates to a method and system for monitoring, and in particular it relates to a method and system for monitoring equipment state using real-time image-monitoring.

Description of the Related Art

With the widespread application of Internet of Things (IoT) technology, many companies and factories install cameras, and a monitoring frame may be displayed on a user interface in real time. In order to meet requirements, a large number of cameras may be installed in the monitored environment to increase the scope of the monitoring.

However, each camera has a limited range, and staff needs to look for abnormalities in the numerous frames presented by the user interface. Alternatively, the monitoring staff needs to view whether the abnormality is in the frame by dragging the progress bar. Accordingly, such monitoring lacks flexibility and timeliness. In addition, in a factory, for example, there is often no way to discover in real time whether the equipment is malfunctioning through the observation and recording of the camera. Therefore, how to discover and quickly find an abnormality has become the focus of technical improvements by various manufacturers.

BRIEF SUMMARY OF THE INVENTION

An embodiment of the present invention provides a method and system for monitoring equipment state, thereby allowing the user to quickly find abnormalities and increasing the flexibility and timeliness of monitoring.

An embodiment of the present invention provides a method for monitoring equipment state, which includes the following steps. At least one input is received to generate a configuration file, wherein the configuration file includes a first equipment identifier, a first photographing equipment address and a first photographing viewing angle code that are associated. It is determined whether a first abnormal signal having the first equipment identifier is received. The first photographing equipment address and the second photographing viewing angle code associated with the first equipment identifier from the configuration file in response to the first abnormal signal being received. The first photographing viewing angle code is transmitted to a first photographing equipment corresponding to the first photographing equipment address through a communication channel. The first photographing equipment is driven to photograph first equipment corresponding to the first equipment identifier at a viewing angle corresponding to the first photographing viewing angle code to generate a first monitoring image and display the first monitoring image on display equipment.

In addition, an embodiment of the present invention provides a system for monitoring equipment state, which includes setting equipment, a processor, communication equipment and first photographing equipment. The setting equipment is configured to receive at least one input to generate a configuration file, wherein the configuration file includes a first equipment identifier, a first photographing equipment address and a first photographing viewing angle code that are associated. The processor is configured to determine whether a first abnormal signal having the first equipment identifier is received. The processor obtains the first photographing equipment address and the first photographing viewing angle code associated with the first equipment identifier from the configuration file in response to the first abnormal signal being received. The communication equipment is configured to transmit the first photographing viewing angle code according to the first photographing equipment address through a communication channel. The first photographing equipment corresponds to the first photographing equipment address. The first photographing equipment is configured to receive the first photographing viewing angle code, drive the first photographing equipment to photograph a first equipment corresponding to the first equipment identifier at a viewing angle corresponding to the first photographing viewing angle code to generate a first monitoring image and display the first monitoring image on a display equipment.

According to the embodiments of the method and system for monitoring the equipment state, the equipment identifier, the photographing equipment address and the photographing viewing angle code are associated. When the abnormal signal having the equipment identifier is received, the photographing equipment address and the photographing viewing angle code corresponding to the equipment identifier are obtained according to the abnormal signal. The photographing viewing angle code is transmitted according to the photographing equipment address through the communication channel. Accordingly, the photographing equipment corresponding to the photographing equipment address photographs the equipment corresponding to the equipment identifier at the viewing angle corresponding to the photographing viewing angle code, so as to generate the monitoring image and display the monitoring image. Therefore, the effect of quickly finding the abnormality is achieved and the flexibility and timeliness of monitoring is increased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1:
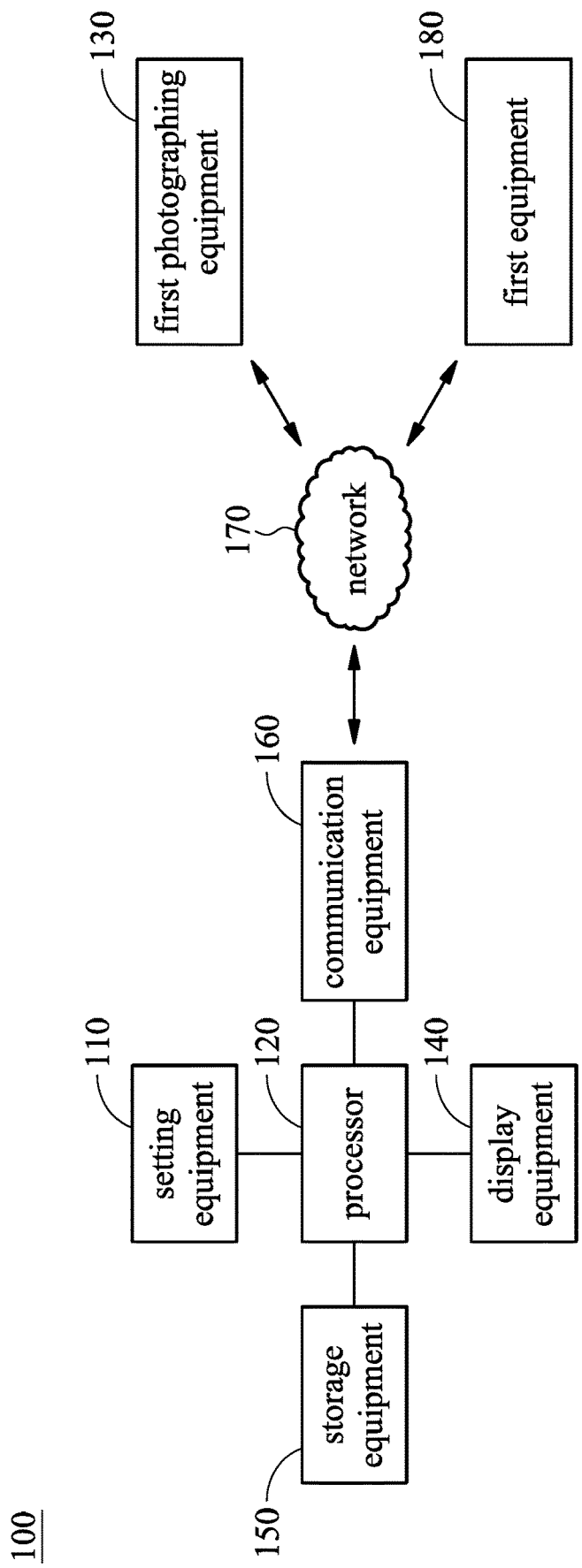
FIG. 1 shows a schematic view of a system for monitoring equipment state according to an embodiment of the present invention.

FIG. 1 shows a schematic view of a system for monitoring equipment state according to an embodiment of the present invention. Please refer to FIG. 1. The system for monitoring the equipment state 100 includes setting equipment 110, a processor 120, communication equipment 160, first photographing equipment 130 and display equipment 140.

The processor 120 may be a general-purpose processor, a micro control unit (MCU), an application processor (AP), a digital signal processor (DSP), etc. The processor 120 may include various circuit logic for providing functions of data processing and computing, controlling the operation of the communication equipment 160 to provide network connections, reading or storing data from storage equipment 150, and receiving or outputting signals from the input and output equipment. In particular, the processor 120 is configured to coordinate the operation of the communication equipment 160, the storage equipment 150 and the input and output equipment to perform the monitoring for the equipment state of the present application. In particular, the storage equipment 150 further stores the program codes of the monitoring for the equipment state of the present application and the program codes are loaded and performed by the processor 120. The communication equipment 160 is configured to provide a network connection to a network 170, and may further be connected to a plurality of equipment or devices in the factory and the remote server through the network 170. The communication equipment 160 may provide the network connection through a wire manner, such as Ethernet, optical fiber network, asymmetric digital subscriber line (ADSL), etc. Alternatively, the communication equipment 160 may also provide the network connection through a wireless manner, such as wireless fidelity (WiFi) technology, or other telecommunication network technologies. However, in other embodiments of the present invention, the communication equipment 160 may be connected through various communication channels of other non-network communication protocols, such as recommended standard-232 (RS-232).

The setting equipment 110 is configured to receive at least one input to generate a configuration file, wherein the configuration file includes a first equipment identifier, a first photographing equipment address and a first photographing viewing angle code. In the embodiment, the first equipment identifier is, for example, a unique identifier (UID) or a property number of first equipment 180. The first photographing equipment address is, for example, a network IP address. The first photographing viewing angle code indicates a viewing angle of the first photographing equipment 130 relative to a reference line or a reference plane in a selected space. The first photographing equipment 130 is, for example, a camera that is rotatable and has a viewing angle of 360 degrees.

For example, when the first photographing viewing angle code is "1", the viewing angle of the first photographing equipment 130 is, for example, 0 degree to 90 degrees. When the first photographing viewing angle code is "2", the viewing angle of the first photographing equipment 130 is, for example, 90 degrees to 180 degrees. When the first photographing viewing angle code is "3", the viewing angle of the first photographing equipment 130 is, for example, 180 degrees to 270 degrees. When the first photographing viewing angle code is "4", the viewing angle of the first photographing equipment 130 is, for example, 270 degrees to 360 degrees. A corresponding relationship of the first photographing viewing angle code and the viewing angle of the first photographing equipment 130 is one exemplary embodiment of the present invention, but not intended to limit the embodiment of the present invention. The user may adjust the corresponding relationship of the first photographing viewing angle code and the viewing angle of the first photographing equipment 130 according the requirement thereof. In addition, a corresponding relationship of the photographing viewing angle code and the viewing angle is one example. The user may set or change the corresponding relationship of the viewing angle code and amplitude of the viewing angle according to the actual requirement. For example, when the first photographing viewing angle code is "1", the viewing angle of the first photographing equipment 130 is, for example, 30 degrees.

Figure 2:
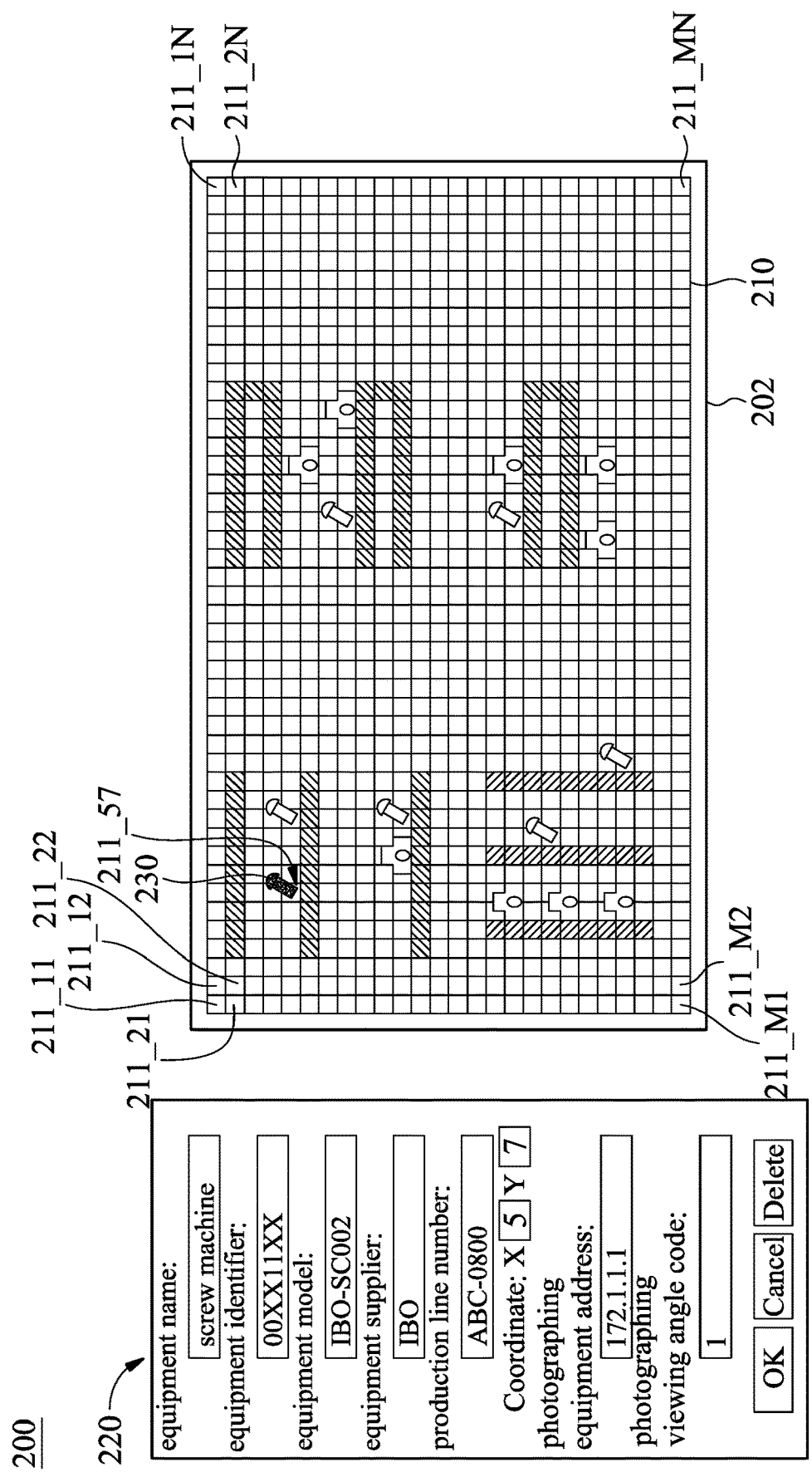
FIG. 2 shows a schematic view of a user interface according to an embodiment of the present invention.

In one embodiment, the setting equipment 110 may provide an editing interface 220 on the user interface 200 displayed on the display equipment 140, as shown in FIG. 2. The editing interface 220 may at least include an equipment identifier field, a photographing equipment address field and a photographing viewing angle code field. Therefore, the user may respectively input the equipment identifier, the photographing equipment address and the photographing viewing angle code for new added or modified equipment through the equipment identifier field, the photographing equipment address field and the photographing viewing angle code field of the editing area 220. After the user presses an "OK" button, the setting equipment 110 may correspondingly generate the configuration file, and the configuration file may include the first equipment identifier, the first photographing equipment address and the first photographing viewing angle code. It is assumed that the first equipment identifier is "00XX11XX", the first photographing equipment address is "172.1.1.1" and the first photographing viewing angle code is "1".

Furthermore, the editing area 220 may also include other editing fields, such as a coordinate field, an equipment name field, an equipment model field, an equipment supplier field, a production line number field, etc. That is, the user may input the coordinate, the equipment name, the equipment model, the equipment supplier and the production line number through the above fields of the editing area 220. Accordingly, the configuration file generated by the setting equipment 110 also includes messages of the coordinate, the equipment name, the equipment model, the equipment supplier and the production line number.

In some embodiments, the setting equipment 110 may be an application program performed by the processor 120.

That is, after the setting equipment 110 is performed by the processor 120, the setting equipment 110 receives at least one input to generate the configuration file. In some embodiments, the setting equipment 110 is equipment or a device that is independent of processor 120 and the setting equipment 110 is used to receives at least one input to generate the configuration file.

The processor 120 is configured to associate the first equipment identifier, the first photographing equipment address and the first photographing viewing angle code according to the configuration file. That is, the processor 120 may associate the first equipment identifier, the first photographing equipment address and the first photographing viewing angle code in the configuration file, so that the first equipment identifier, the first photographing equipment address and the first photographing viewing angle code have a corresponding relationship.

The processor 120 may receive a first abnormal signal having the first equipment identifier. In the embodiment, the first abnormal signal is, for example, generated by first equipment 180 corresponding to the first equipment identifier, and the first abnormal signal indicates that the first equipment is abnormal. The first abnormal signal may be transmitted to the processor 120 through the network 170.

Then, the processor 120 may obtain the first photographing equipment address and the first photographing viewing angle code corresponding to the first equipment identifier through the configuration file according to the first equipment identifier of the first abnormal signal. Afterward, the processor 120 may transmit the first photographing viewing angle code "1" according to the first photographing equipment address through the network 170.

The first photographing equipment 130 corresponds to the first photographing equipment address. For example, the first photographing equipment 130 communicates with the processor 120 through a real time streaming protocol (RTSP), so as to receive the first photographing viewing angle code. Then, according to the first photographing viewing angle code "1", the first photographing equipment 130 directly photographs the first equipment 180 corresponding to the first equipment identifier, or turns to a viewing angle corresponding to first photographing viewing angle code "1" to photograph the first equipment 180, so as to generate a first monitoring image.

Afterward, the first photographing equipment 130 transmits the first monitoring image to the processor 120 through the network 170. Then, the processor 120 may control the display equipment 140 to display the first monitoring image.

In addition, in the embodiment, the processor 120 stores the first monitoring image based on a the time at which the first abnormal signal is generated. That is, the processor 120 stores the first monitoring image in the storage equipment 150, or transmits the first monitoring image to a database of the server through the network 170. In the embodiment, the processor 120 discontinues the storage of the first monitoring image based on a time at which the first abnormal signal ends. That is, the processor 120 stores the first monitoring image when the first equipment 180 is abnormal and does not store the monitoring image when the first equipment 180 is normal. Therefore, the requirement of storage space may be decreased, and the maintenance staff may also quickly find the image when the first equipment 180 is abnormal.

Furthermore, the first abnormal signal may be generated by the first equipment 180 or the first abnormal signal may be generated by analyzing the first monitoring image through the processor 120. That is, when the first equipment 180 is abnormal, the first equipment 180 may generate the first abnormal signal and transmit the first abnormal signal to the processor 120 through the network 170.

Alternatively, the processor 120 may obtain the first monitoring image of the first photographing equipment 130, and analyze the first monitoring image. For example, the processor 120 discovers that the abnormal indicator (such as an abnormal light) corresponding to the first equipment 180 lights in the first monitoring image, so that the processor 120 may generate the first abnormal signal.

Furthermore, in the above embodiments, the communication equipment 160, the first equipment 180 and the first photographing equipment 130 are connected through the network, but not intended to limit the embodiment of the present invention. In other embodiments of the present invention, different pieces of equipment may be connected through different communication channels. For example, the communication equipment 160 and the first photographing equipment 130 are connected through the network, and the communication equipment 160 and the first equipment 180 are connected through RS-232.

Figure 3:
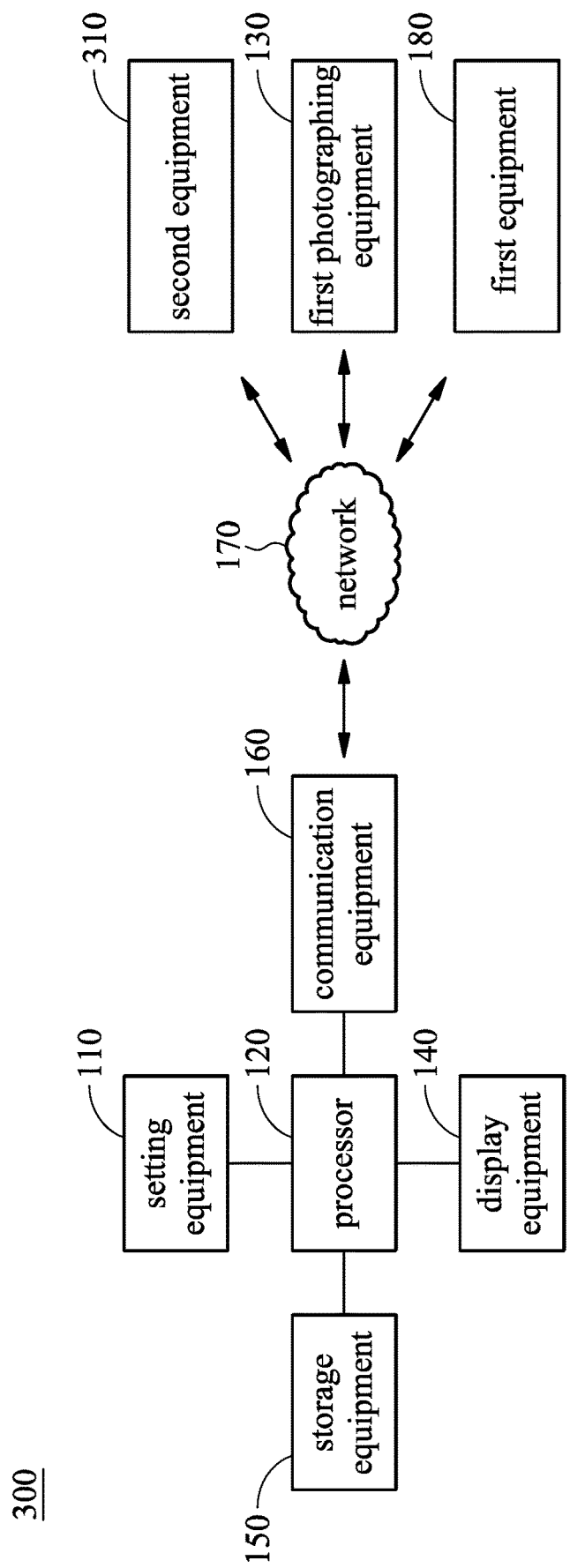
FIG. 3 shows a schematic view of a system for monitoring equipment state according to another embodiment of the present invention.

FIG. 3 shows a schematic view of a system for monitoring equipment state according to another embodiment of the present invention. Please refer to FIG. 3. The system for monitoring the equipment state 300 includes setting equipment 110, a processor 120, first photographing equipment 130 and display equipment 140.

The setting equipment 110 receives at least one input to generate a configuration file, wherein the configuration file includes a first equipment identifier, a first photographing equipment address, a first photographing viewing angle code, a second equipment identifier and a second photographing viewing angle code. The manner that the setting equipment 110 receives at least one input to generate the configuration file may refer to the description of the embodiment in FIGS. 1 and 2, and the description thereof is not repeated herein. In the embodiment, the second equipment identifier is, for example, a unique identifier or a property number of the second equipment 310. It is assumed that the first equipment identifier is "00XX11XX", the first photographing equipment address is "172.1.1.1", the first photographing viewing angle code is "1", the second equipment identifier is "00XX12XX", the second photographing viewing angle code is "3".

Then, the processor 120 associates the first equipment identifier, the first photographing equipment address and the first photographing viewing angle code according to the configuration file, and associates the second equipment identifier, the first photographing equipment address and the second photographing viewing angle code according to the configuration file. That is, the processor 120 may associate the first equipment identifier, the first photographing equipment address and the first photographing viewing angle code in the configuration file, so that the first equipment identifier, the first photographing equipment address and the first photographing viewing angle code have a corresponding relationship. In addition, the processor 120 may also associate the second equipment identifier, the first photographing equipment address and the second photographing viewing angle code in the configuration file, so that the second equipment identifier, the first photographing equipment address and the second photographing viewing angle code have a corresponding relationship.

The processor 120 may receive a second abnormal signal having the second equipment identifier. In the embodiment, the second abnormal signal is, for example, generated by second equipment 310 corresponding to the second equipment identifier, and the second abnormal signal indicates that the second equipment 310 is abnormal. The second abnormal signal may be transmitted to the processor 120 through the network 170.

Then, the processor 120 may obtain the first photographing equipment address and the second photographing viewing angle code corresponding to the second equipment identifier through the configuration file according to the second equipment identifier of the second abnormal signal. Afterward, the processor 120 may transmit the second photographing viewing angle code "3" according to the first photographing equipment address through the network 170.

For example, the first photographing equipment 130 communicates with the processor 120 through the real time streaming protocol, so as to receive the second photographing viewing angle code. Then, according to the second photographing viewing angle code "3", the first photographing equipment 130 directly photographs the second equipment 310 corresponding to the second equipment identifier, or turns to a viewing angle corresponding to the second photographing viewing angle code "3" to photograph the second equipment 310, so as to generate a second monitoring image. Afterward, the first photographing equipment 130 transmits the second monitoring image to the processor 120 through the network 170. Then, the processor 120 may control the display equipment 140 to display the second monitoring image.

Furthermore, the processor 120 may determine whether the first abnormal signal and/or the second abnormal signal are received. When the processor 120 receives the first abnormal signal, the processor 120 may obtain the first photographing equipment address and the first photographing viewing angle code "1" corresponding to the first equipment identifier from the configuration file according to the first abnormal signal in response to receiving the first abnormal.

Then, the processor 120 may obtain the first photographing equipment address and the first photographing viewing angle code "1" corresponding to the first equipment identifier according to the first equipment identifier of the first abnormal signal. Afterward, the processor 120 may transmit the first photographing viewing angle code "1" according to the first photographing address through the network 170. The first photographing equipment 130 communicates with the processor 120, so as to receive the first photographing viewing angle code "1".

Then, according to the first photographing viewing angle code "1", the first photographing equipment 130 directly photographs the first equipment 180 corresponding to the first equipment identifier, or turns to a viewing angle corresponding to first photographing viewing angle code "1" to photograph the first equipment 180, so as to generate the first monitoring image. Afterward, the first photographing equipment 130 transmits the first monitoring image to the processor 120 through the network 170. Then, the processor 120 may control the display equipment 140 to display the first monitoring image.

Furthermore, when the processor 120 receives the first abnormal signal and the second abnormal signal at the same time, the processor 120 may obtain the first photographing equipment address and the first photographing viewing angle code "1" corresponding to the first equipment identifier and first photographing equipment address and the second photographing viewing angle code "3" corresponding to the second equipment identifier according to the first abnormal signal and the second abnormal signal in response to receiving the first abnormal signal and the second abnormal signal.

Then, the processor 120 transmits the first photographing viewing angle code "1" and the second photographing viewing angle code "3" in turn according to first photographing equipment address through the network 170. The first photographing equipment 130 communicates with the processor 120, so as to receive the first photographing viewing angle code "1" and the second photographing viewing angle code "3", respectively. Then, the first photographing equipment 130 photographs the first equipment 130 and the second equipment 310 in turn according to the first photographing viewing angle code "1" and the second photographing viewing angle code "3". For example, the first photographing equipment 130 firstly turns to a viewing angle corresponding to the first photographing viewing angle code "1" to photograph the first equipment 180, so as to generate the first monitoring image. Afterward, the first photographing equipment 130 turns to a viewing angle corresponding to the second photographing viewing angle code "3" to photograph the second equipment 310, so as to generate the second monitoring image.

Then, the first photographing equipment 130 transmits the first monitoring image and the second monitoring image to the processor 120 in turn through the network 170. Afterward, the processor 120 may control the display equipment 140 to display the first monitoring image and the second monitoring image in turn.

In addition, the processor 120 stores the first monitoring image and the second monitoring image based on the times at which the first abnormal signal and the second abnormal signal are generated. That is, the processor 120 stores the first monitoring image and the second monitoring image in the storage equipment 150, or transmits the first monitoring image and the second monitoring image to a database of the server through the network 170. In the embodiment, the processor 120 discontinues the storage of the first monitoring image and the second abnormal image based on the times at which the first abnormal signal and the second abnormal signal end. That is, the processor 120 stores the first monitoring image when the first equipment 180 is abnormal and the second monitoring image when the second equipment 310 is abnormal, and does not store the monitoring image when the first equipment 180 and the second equipment 130 are normal. Therefore, the requirements of storage space may be decreased, and the maintenance staff may also quickly find the image when the first equipment 180 and the second equipment 310 are abnormal.

Furthermore, similar to the embodiment in FIG. 1, the first abnormal signal may be generated by the first equipment 180 or the first abnormal signal may be generated by analyzing the first monitoring image through the processor 120. Similarly, the second abnormal signal may be generated by the second equipment 310 or the second abnormal signal may be generated by analyzing the second monitoring image through the processor 120.

In the embodiment, one piece of photographing equipment (i.e., the first photographing equipment 130) is configured to correspond to two pieces of equipment (i.e., the first equipment 180 and the second equipment 310), but not intended to limit the embodiment of the present invention. In some embodiments, one piece of photographing equipment (i.e., the first photographing equipment 130) may be configured to correspond to three or more pieces of equipment, and the corresponding setting and operation may refer to the description of the above embodiment.

Figure 4:
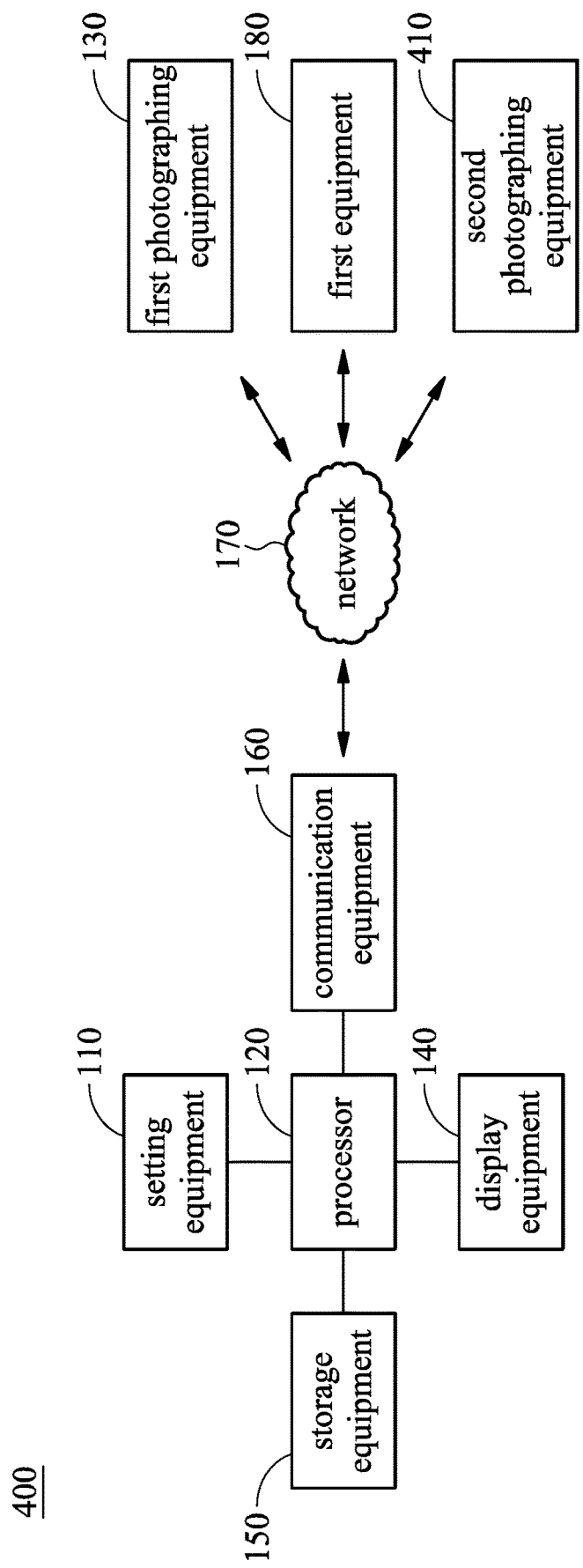
FIG. 4 shows a schematic view of a system for monitoring equipment state according to another embodiment of the present invention.

FIG. 4 shows a schematic view of a system for monitoring equipment state according to another embodiment of the present invention. In the embodiment, two pieces of photographing equipment corresponds to one piece of equipment. Please refer to FIG. 4. Similar to the embodiment in FIG. 3, the system for monitoring the equipment state 400 includes setting equipment 110, a processor 120, first equipment 180, first photographing equipment 130, display equipment 140 and second photographing equipment 410. In the embodiment, the first photographing equipment 130 and the second photographing equipment 410 are associated with the first equipment identifier of the first equipment 180 according to a configuration file.

The setting equipment 110 receives at least one input to generate the configuration file, wherein the configuration file includes a first equipment identifier, a first photographing equipment address, a first photographing viewing angle code, a second photographing equipment address and a second photographing viewing angle code. The setting of the second photographing viewing angle code may refer to the setting of the second photographing viewing angle code in FIG. 1, and the description thereof is not repeated herein. The second photographing equipment address is, for example, an address of the second photographing equipment 410. The second photographing viewing angle code indicates a viewing angle of the second photographing equipment 410. In the embodiment, the second photographing equipment 410 is, for example, a camera that is rotatable and has a viewing angle of 360 degrees. It is assumed that the first equipment identifier is "00XX11XX", the first photographing equipment address is "172.1.1.1", the first photographing viewing angle code is "1", the second photographing equipment address is "172.1.1.2" and the second photographing viewing angle code is "3".

Then, the processor 120 may further associate the first equipment identifier, the first photographing equipment address, the first photographing viewing angle code, the second photographing equipment address and the second photographing viewing angle code according to the configuration file. That is, the processor 120 may associate the first equipment identifier, the first photographing equipment address, the first photographing viewing angle code, the second photographing equipment address and the second photographing viewing angle code, so that the first equipment identifier, the first photographing equipment address, the first photographing viewing angle code, the second photographing equipment address and the second photographing viewing angle code have a corresponding relationship.

The processor 120 receives a first abnormal signal having the first equipment identifier. In the embodiment, the first abnormal signal is, for example, generated by first equipment 180 corresponding to the first equipment identifier, and the first abnormal signal indicates that the first equipment 180 is abnormal. The first abnormal signal may be transmitted to the processor 120 through the network 170.

Then, the processor 120 may obtain the first photographing equipment address, the first photographing viewing angle code, the second photographing equipment address and the second photographing viewing angle code corresponding to the first equipment identifier according to the first equipment identifier of the first abnormal signal. Afterward, the processor 120 may transmit the first photographing viewing angle code "1" and the second photographing viewing angle code "3" according to the first photographing equipment address and the second photographing equipment address through the network 170.

For example, the first photographing equipment 130 and the second photographing equipment 410 communicate with the processor 120 through the real time streaming protocol, so as to receive the first photographing viewing angle code "1" and the second photographing viewing angle code "3". Then, according to the first photographing viewing angle code "1", the first photographing equipment 130 directly photographs the first equipment 180 corresponding to the first equipment identifier, or turns to a viewing angle corresponding to the first photographing viewing angle code "1" to photograph the first equipment 180, so as to generate the first monitoring image.

In addition, according to the second photographing viewing angle code "3", the second photographing equipment 410 directly photographs the first equipment 180 corresponding to the first equipment identifier, or turns to a viewing angle corresponding to the second photographing viewing angle code "3" to photograph the first equipment 180, so as to generate the second monitoring image.

The first photographing equipment 130 and the second photographing equipment 410 transmit the first monitoring image and the second monitoring image to the processor 120 through the network 170. Then, the processor 120 may control the display equipment 140 to display the first monitoring image and the second monitoring image. Furthermore, the processor 120 may control the display equipment 140 to display the first monitoring image and the second monitoring image at the same time, or display the first monitoring image and the second monitoring image in turn.

In addition, the processor 120 stores the first monitoring image and the second monitoring image based on the time at which the first abnormal signal is generated. That is, the processor 120 stores the first monitoring image and the second monitoring image in the storage equipment 150, or transmits the first monitoring image and the second monitoring image to a database of the server through the network 170. In the embodiment, the processor 120 discontinues the storage of the first monitoring image and the second abnormal image based on the time at which the first abnormal signal ends.

That is, the processor 120 stores the first monitoring image and the second monitoring image when the first equipment 180 is abnormal, and does not store the monitoring image when the first equipment 180 is normal. Therefore, the requirements of storage space may be decreased, and the maintenance staff may also quickly find the image when the first equipment 180 is abnormal.

Furthermore, similar to the above embodiment, the first abnormal signal may be generated by the first equipment 180 or the first abnormal signal may be generated by analyzing the first monitoring image and the second monitoring image through the processor 120.

In the embodiment, two pieces of photographing equipment (i.e., the first photographing equipment 130 and the second photographing equipment 140) are configured to correspond to one piece of equipment (i.e., the first equipment 180), but not intended to limit the embodiment of the present invention. In some embodiments, three or more pieces of photographing equipment may be configured to correspond to one piece of equipment (i.e., the first equipment 180), and the corresponding setting and operation may refer to the description of the above embodiment.

Figure 5:
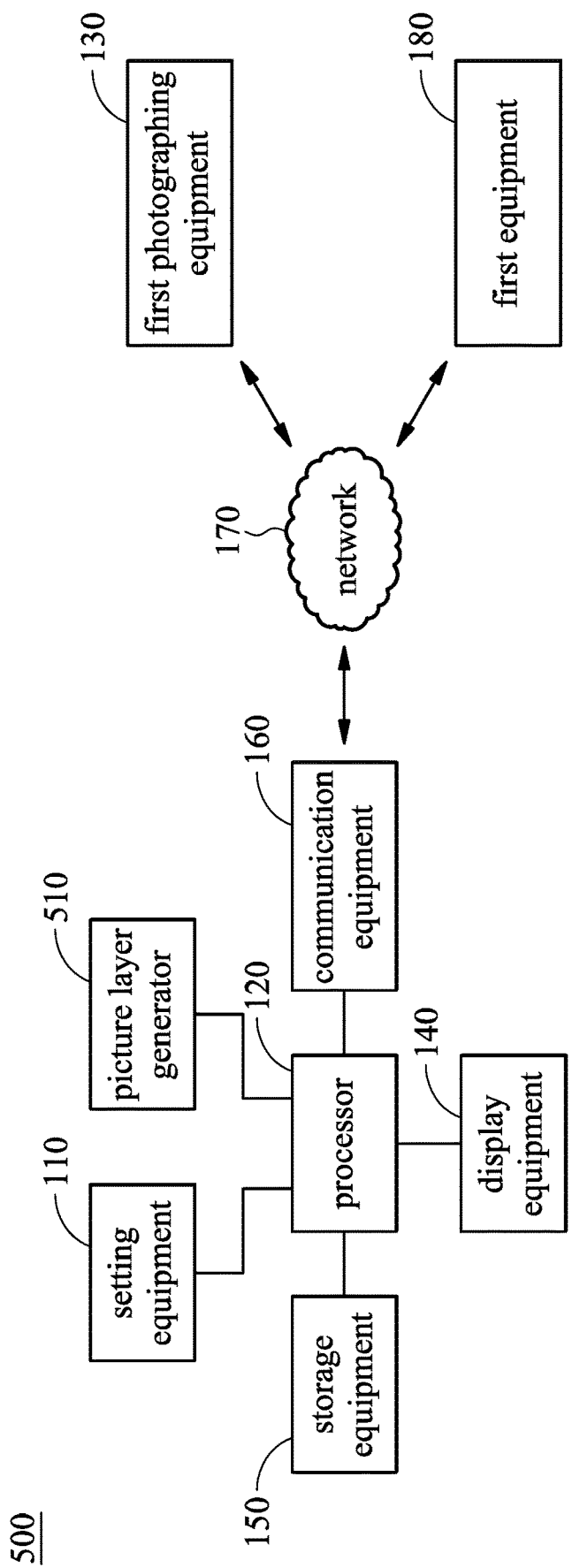
FIG. 5 shows a schematic view of a system for monitoring equipment state according to another embodiment of the present invention.

FIG. 5 shows a schematic view of a system for monitoring equipment state according to another embodiment of the present invention. Please refer to FIG. 5. The system for monitoring the equipment state 500 includes setting equipment 110, a processor 120, first photographing equipment 130, display equipment 140 and a picture layer generator 510.

The setting equipment 110 receives at least one input to generate a configuration file, wherein the configuration file includes a first equipment identifier, a first photographing equipment address, a first photographing viewing angle code and a coordinate value. For example, the setting equipment 110 may provide an editing area 220 on the user interface 200 displayed on the display equipment 140, as shown in FIG. 2. The editing area 220 may at least include an equipment identifier field and a coordinate filed. Therefore, the user may input the equipment identifier and the coordinate value through the equipment identifier field and the coordinate field (X, Y) of the editing area 220. After the user presses an "OK" button, the setting equipment 110 may correspondingly generate the configuration file, and the configuration file may include the first equipment identifier, the first photographing equipment address, the first photographing viewing angle code and the first coordinate value. It is assumed that the first equipment identifier is "00XX11XX", the first photographing equipment address is "172.1.1.1", the first photographing viewing angle code is "1" and the first coordinate value is (X, Y)=(1, 5).

The picture layer generator 510 provides a positioned picture layer 202, and the positioned picture layer 202 includes a base map 210, as shown in FIG. 2. For example, the base map 210 provided by the picture layer generator 110 may be presented on a user interface 200 of the display equipment 140, and the base map 210 may correspond to the site layout of the factory.

Further, the base map 210 may be proportional to the site layout of the factory, the base map 210 may be similar to the site layout of the factory, or the base map 210 is simply a schematic layout of the site shape of the factory. In an embodiment of the present invention, the positioned picture layer 202 may include the site layout of the factory, and the base map 210 may be stacked on the site layout of the factory. Therefore, the user may monitor and manage the state of the equipment of the factory through the content displayed on the base map 210.

In some embodiments, the picture layer generator 510 may be an application program performed by the processor 120. That is, after the picture layer generator 510 is performed by the processor 120, the positioned picture layer 202 including the base map 210 presented on the user interface 200 is provided. In some embodiments, the picture layer generator 510 is equipment or a device that is independent of processor 120 and the picture layer generator 510 may provide the positioned picture layer 202 including the base map 210 presented on the user interface 200.

Furthermore, the picture layer generator 510 may divide the base map 210 into a plurality of grids, so that the base map 210 includes the grids 211_11, 211_12, . . . , 211_1N, 211_21, 211_22, . . . , 211_2N, 211_M1, 211_M2, . . . , 211_MN, wherein N and M are positive integers greater than 1.

In the embodiment, N and M may be the same or different. The user may adjust the numbers of N and M according the requirement thereof to conform with or similar to the site layout of the factory. The grids 211_11 to 211_MN may be presented on the user interface 200, for example, in a manner similar to a checkerboard or lattice.

In addition, after the base map 210 is divided into grids 211_11 to 211_MN, the positioned layer generator 510 may set coordinates for the grids 211_11 to 211_MN, so that each of the grids 211_11 to 211_MN includes a second coordinate value.

The second coordinate value corresponding to the grid 211_11 is, for example, (X, Y)=(1, 1), the second coordinate value corresponding to the grid 211_12 is, for example, (X, Y)=(1, 2), . . . , the second coordinate value corresponding to the grid 211_1N is, for example, (X, Y)=(1, N), the second coordinate value corresponding to the grid 211_21 is for example, (X, Y)=(2, 1), the second coordinate value corresponding to the grid 211_22 is, for example, (X, Y)=(2, 2), . . . , the second coordinate value corresponding to the grid 211_2N is, for example, (X, Y)=(2, N), the first coordinate value corresponding to the grid 211_M1 is, for example, (X, Y)=(M, 1), the second coordinate value corresponding to the grid 211_M2 is, for example, (X, Y)=(M, 2), . . . , the second coordinate value corresponding to the grid 211_MN, is for, example, (X, Y)=(M, N). In the embodiment, X is, for example, an ordinate, and Y is, for example, an abscissa.

The processor 120 receives the related information of the base map 210 and the configuration file of the equipment. Then, the processor 120 may associates the first coordinate value of the configuration file with the second coordinate values of grids 211_11 to 211_MN of the base map 210 according to the configuration file to find and determine the grid associated with the first coordinate value.

For example, after the processor 120 obtain the configuration file of the first equipment 180, the processor 120 may obtain the first equipment identifier and the first coordinate value (i.e., (X, Y)=(5, 7)) corresponding to the first equipment identifier from the configuration file. Then, the processor 120 may find the corresponding second coordinate value (i.e., (X, Y)=(5, 7)) in the base map 210 according to the first coordinate value. Afterward, the processor 120 obtains the grid (such as the grid 211_57) corresponding to the second coordinate value according the obtained second coordinate value (i.e., (X, Y)=(5, 7)). Therefore, the processor 120 may determine that the grid 211_57 is associated with the first coordinate value (i.e., (X, Y)=(5, 7)) corresponding to the first equipment identifier.

In addition, the processor 120 may also generate an equipment icon 230 according to the equipment name. That is, when the user input or select the equipment name in the editing area 220, the processor 120 may find the equipment icon corresponding to the equipment name in a database according to the equipment name. In some embodiments, the processor 120 may generate the equipment icon 230 according to the equipment identifier. That is, when the user input the equipment identifier in the editing area 220, the processor 120 may find the equipment name corresponding to the equipment identifier in the database according to the equipment identifier and then find the equipment icon corresponding to the equipment name according to the equipment name. In the embodiment, the above equipment icon may include equipment icons corresponding to the equipment, such as a camera, a screw machine, an inspection machine, a labeling machine, a sealing machine, an assembly machine, a hot melt machine, etc. In addition, the above database may be configured in the server.

After the processor 120 determines the grid 211_57 associated with the first coordinate value corresponding to the first equipment identifier and generates the equipment icon 230, the processor 120 may display the equipment icon 230 on the grid 211_57 on the display equipment 140. Therefore, after all equipment icons 230 associated with the configuration file of the equipment are disposed on the base map, the user may monitor and manage the state of particular or all equipment of the factory through the content displayed on the display equipment 140.

In above embodiments, the abnormal signal is generated by the equipment or the abnormal signal is generated by analyzing the monitoring image. However, in other embodiments of the present invention, the abnormal signal may also be generated by operating the user interface 200 in the monitoring terminal through the user. For example, when the user needs to view the monitoring image of the first equipment 180, the user may perform a clicking operation for the corresponding equipment icon 230 on the user interface 200 by operating a mouse or a touch panel. After performing the clicking operation, the user interface 200 displays, for example, an input window, and then the user may input a verification password on the input window by operating a keyboard.

Then, the processor 120 may receive the clicking operation corresponding to the equipment icon 230 and receive the verification password. The processor 120 may determine whether the verification password is identical to a predetermined password. When the verification password is not identical to the predetermined password, the processor 120 does not generate the corresponding operation. When the verification password is identical to the predetermined password, the processor 120 may obtain the first equipment identifier corresponding to the equipment icon 230 and the first photographing equipment address "172.1.1.1" and the first photographing viewing angle code "1" corresponding to the first equipment identifier from the configuration file according to the equipment icon 230 in response to the verification password being identical to the predetermined password. However, the above-mentioned password verification step may be omitted or authorized in other alternative manners without considering security or being in a security environment.

Afterward, the processor 120 may transmit the first photographing viewing angle code "1" to the first photographing equipment 130 according to the first photographing equipment address through the network 170. Then, according to the first photographing viewing angle code "1", the first photographing equipment 130 directly photographs the first equipment 180 corresponding to the first equipment identifier, or turns to a viewing angle corresponding to the first photographing viewing angle code "1" to photograph the first equipment 180, so as to generate the first monitoring image. Therefore, the processor 120 obtains the first monitoring image through the network 170 and controls the display equipment 140 to display the first monitoring image.

When the user needs to replace the position of the equipment icon 230, the user may input the equipment identifier "00XX11XX" and a third coordinate value (such as (X, Y)=(11, 4)) through the editing area 220 or directly replace the coordinate to the third coordinate value through the editing area 220 appeared after clicking the equipment icon by the mouse cursor. After the user presses an "OK" button, the setting equipment 110 may generate the corresponding configuration file (i.e., the updated configuration file), and the configuration file may include the equipment identifier "00XX11XX" and the third coordinate value ((X, Y)=(11, 4)). In the embodiment, the configuration file is used for replacing the position of the equipment icon 230.

After the processor 120 obtains the above configuration file, the processor 120 may obtain the third coordinate value (i.e., (X, Y)=(11, 4)). Then, the processor 120 may find the corresponding second coordinate value (i.e., (X, Y)=(11, 4)) in the base map 210 according to the third coordinate value ((X, Y)=(11, 4)). Afterward, the processor 120 obtains the grid (such as the grid 211_114) corresponding to the second coordinate value according to the obtained second coordinate value ((X, Y)=(11, 4)). Therefore, the processor 120 may determine that the grid 211_114 associates with the third coordinate value ((X, Y)=(11, 4)) corresponding to the equipment identifier.

After the processor 120 determines the grid 211_114 associated with the third coordinate value ((X, Y)=(11, 4)), the processor 120 may display the equipment icon 230 on the grid 211_114 associated with the third coordinate value ((X, Y)=(11, 4)) on the display equipment 140 and delete the equipment icon 230 displayed on the grid 211_57 associated with the second coordinate value ((X, Y)=(5, 7)) corresponding to the equipment identifier. Therefore, the user may see the replacing state of the equipment icon 230 on the user interface 200.

Figure 6:
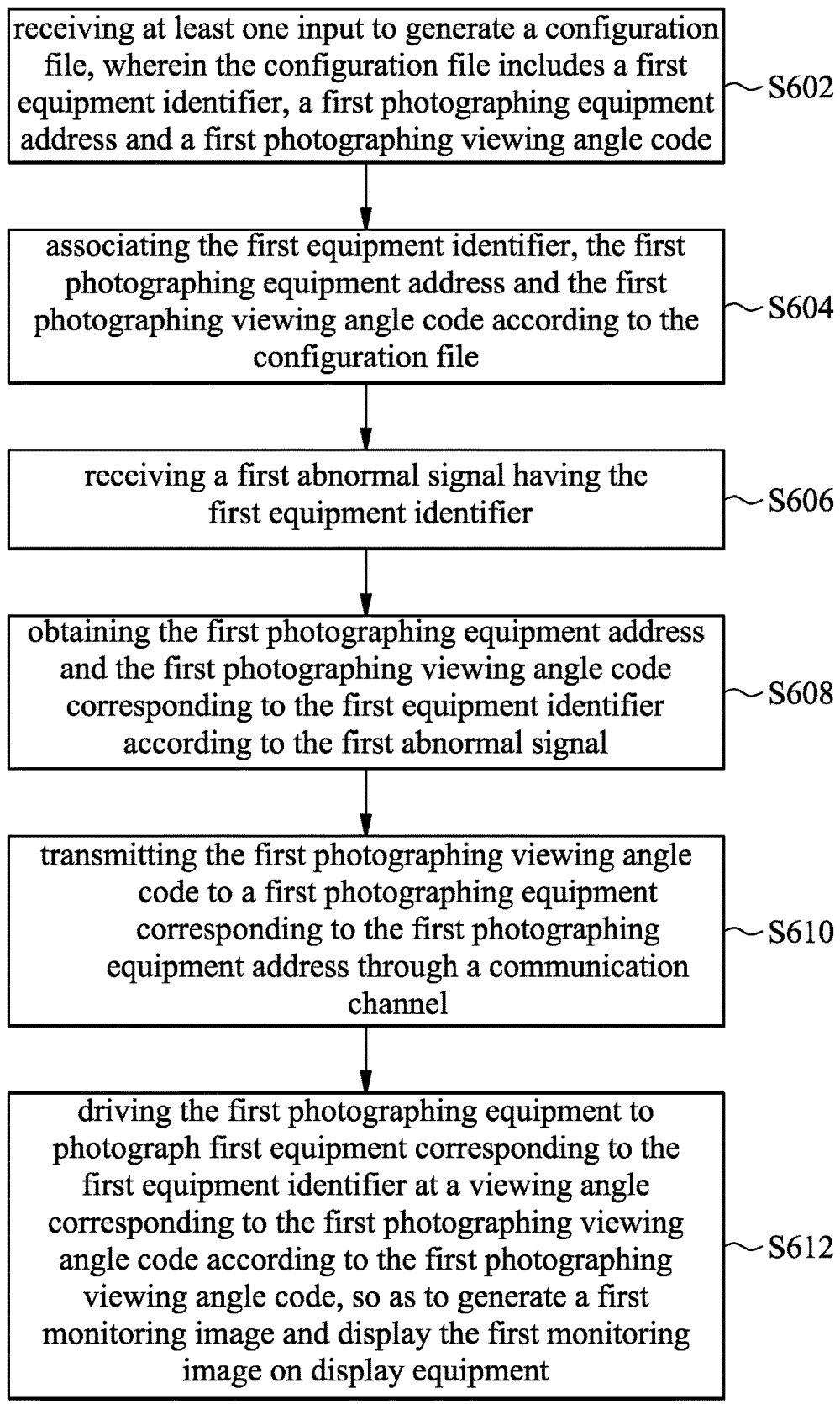
FIG. 6 shows a flowchart of a method for monitoring equipment state according to an embodiment of the present invention.

FIG. 6 shows a flowchart of a method for monitoring equipment state according to an embodiment of the present invention. The flowchart of FIG. 6 corresponds to the system in FIG. 1. In step S602, the method involves receiving at least one input to generate a configuration file, wherein the configuration file includes a first equipment identifier, a first photographing equipment address and a first photographing viewing angle code.

In step S604, the method involves associating the first equipment identifier, the first photographing equipment address and the first photographing viewing angle code according to the configuration file. In step S606, the method involves receiving a first abnormal signal having the first equipment identifier. In step S608, the method involves obtaining the first photographing equipment address and the first photographing viewing angle code corresponding to the first equipment identifier according to the first abnormal signal. In step S610, the method involves transmitting the first photographing viewing angle code to a first photographing equipment corresponding to the first photographing equipment address through a communication channel.

In step S612, the method involves driving the first photographing equipment to photograph first equipment corresponding to the first equipment identifier at a viewing angle corresponding to the first photographing viewing angle code according to the first photographing viewing angle code, so as to generate a first monitoring image and display the first monitoring image on display equipment. In the embodiment, the first abnormal signal is, for example generated by the first equipment. The first abnormal signal is, for example, generated by analyzing the first monitoring image. The first abnormal signal is, for example, generated by clicking the equipment icon corresponding to the first equipment on the user interface of the display equipment through the user.

Figure 7A:
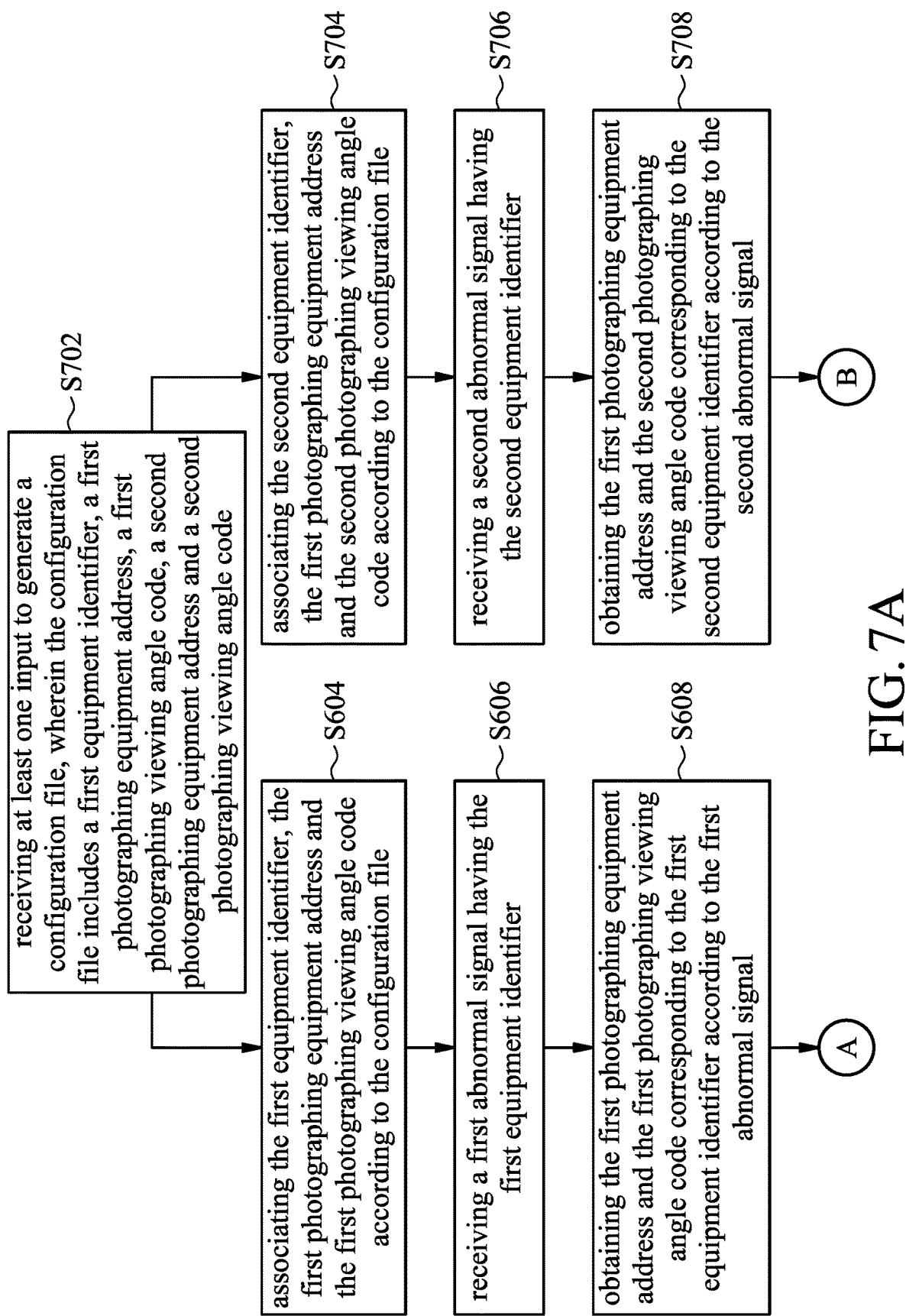
FIGS. 7A and 7B show a flowchart of a method for monitoring equipment state according to another embodiment of the present invention.
Figure 7B:
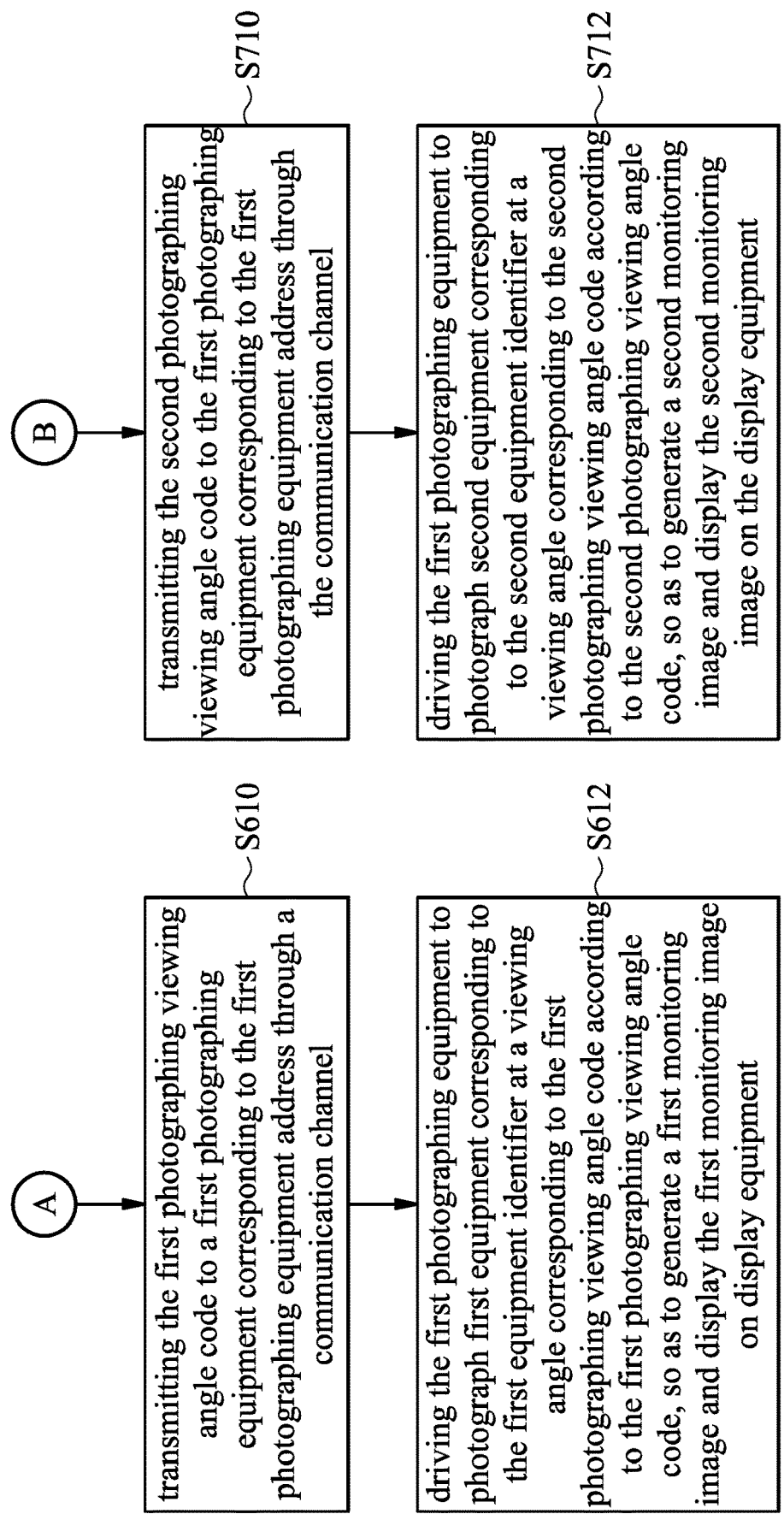

FIGS. 7A and 7B show a flowchart of a method for monitoring equipment state according to another embodiment of the present invention. The flowchart in FIGS. 7A and 7B corresponds to the system in FIG. 3. In step S702, the method involves receiving at least one input to generate a configuration file, wherein the configuration file includes a first equipment identifier, a first photographing equipment address, a first photographing viewing angle code, a second photographing equipment address and a second photographing viewing angle code.

In step S704, the method involves associating the second equipment identifier, the first photographing equipment address and the second photographing viewing angle code according to the configuration file. In step S706, the method involves receiving a second abnormal signal having the second equipment identifier. In step S708, the method involves obtaining the first photographing equipment address and the second photographing viewing angle code corresponding to the second equipment identifier according to the second abnormal signal.

In step S710, the method involves transmitting the second photographing viewing angle code to the first photographing equipment corresponding to the first photographing equipment address through the communication channel. In step S712, the method involves driving the first photographing equipment to photograph second equipment corresponding to the second equipment identifier at a viewing angle corresponding to the second photographing viewing angle code according to the second photographing viewing angle code, so as to generate a second monitoring image and display the second monitoring image on the display equipment. In the embodiment, the second abnormal signal is, for example generated by the second equipment. The second abnormal signal is, for example, generated by analyzing the second monitoring image. The second abnormal signal is, for example, generated by clicking the equipment icon corresponding to the second equipment on the user interface of the display equipment through the user. In addition, continuing to the step S702, the method may perform the steps S604 to S612 in FIG. 6.

Figure 8A:
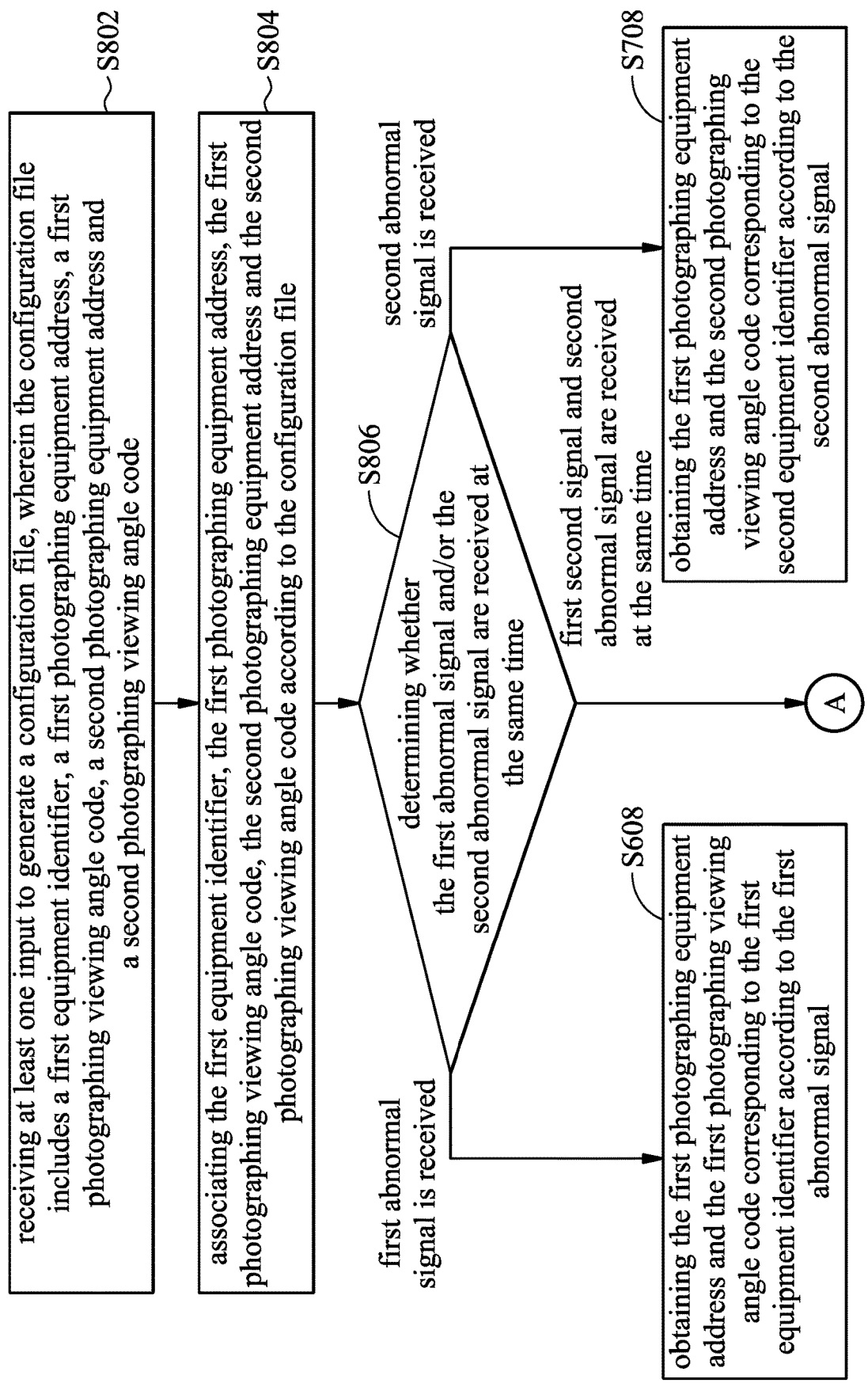
FIGS. 8A and 8B show a flowchart of a method for monitoring equipment state according to another embodiment of the present invention.
Figure 8B:
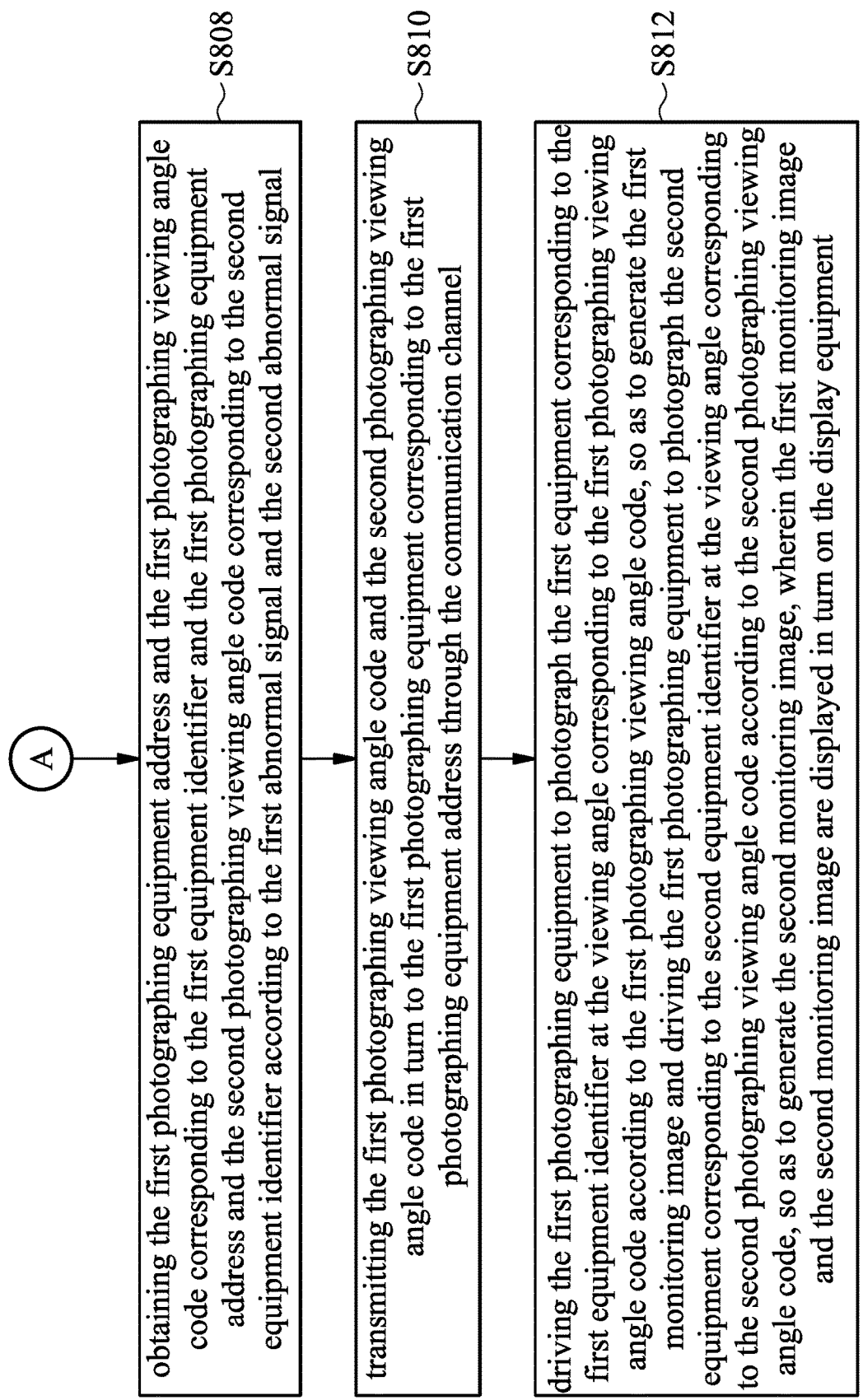

FIGS. 8A and 8B show a flowchart of a method for monitoring equipment state according to another embodiment of the present invention. The flowchart in FIGS. 8A and 8B corresponds to the system in FIG. 3. In step S802, the method involves receiving at least one input to generate a configuration file, wherein the configuration file includes a first equipment identifier, a first photographing equipment address, a first photographing viewing angle code, a second photographing equipment address and a second photographing viewing angle code. In step S804, the method involves associating the first equipment identifier, the first photographing equipment address, the first photographing viewing angle code, the second photographing equipment address and the second photographing viewing angle code according to the configuration file.

In step S806, the method involves determining whether the first abnormal signal and/or the second abnormal signal are received at the same time. When determining that the first abnormal signal is received, the method performs step S608 in FIG. 6 in response to receiving the first abnormal signal, and then the method performs steps S610 to S612.

When determining that the second abnormal signal is received, the method performs step S708 in FIG. 7 in response to receiving the second abnormal signal, and then the method performs steps S710 to S712.

When determining that the first second signal and the second abnormal signal are received at the same time, the method performs step S808 in response to receiving the first abnormal signal and the second abnormal signal. In the step S808, the method involves obtaining the first photographing equipment address and the first photographing viewing angle code corresponding to the first equipment identifier and the first photographing equipment address and the second photographing viewing angle code corresponding to the second equipment identifier according to the first abnormal signal and the second abnormal signal.

In step S810, the method involves transmitting the first photographing viewing angle code and the second photographing viewing angle code in turn to the first photographing equipment corresponding to the first photographing equipment address through the communication channel. In step S812, the method involves driving the first photographing equipment to photograph the first equipment corresponding to the first equipment identifier at the viewing angle corresponding to the first photographing viewing angle code according to the first photographing viewing angle code, so as to generate the first monitoring image and driving the first photographing equipment to photograph the second equipment corresponding to the second equipment identifier at the viewing angle corresponding to the second photographing viewing angle code according to the second photographing viewing angle code, so as to generate the second monitoring image, wherein the first monitoring image and the second monitoring image are displayed in turn on the display equipment. In the embodiment, the first abnormal signal is, for example generated by the first equipment. The first abnormal signal is, for example, generated by analyzing the first monitoring image. The first abnormal signal is, for example, generated by clicking the equipment icon corresponding to the first equipment on the user interface of the display equipment through the user. The second abnormal signal is, for example generated by the second equipment. The second abnormal signal is, for example, generated by analyzing the second monitoring image. The second abnormal signal is, for example, generated by clicking the equipment icon corresponding to the second equipment on the user interface of the display equipment through the user.

Figure 9A:
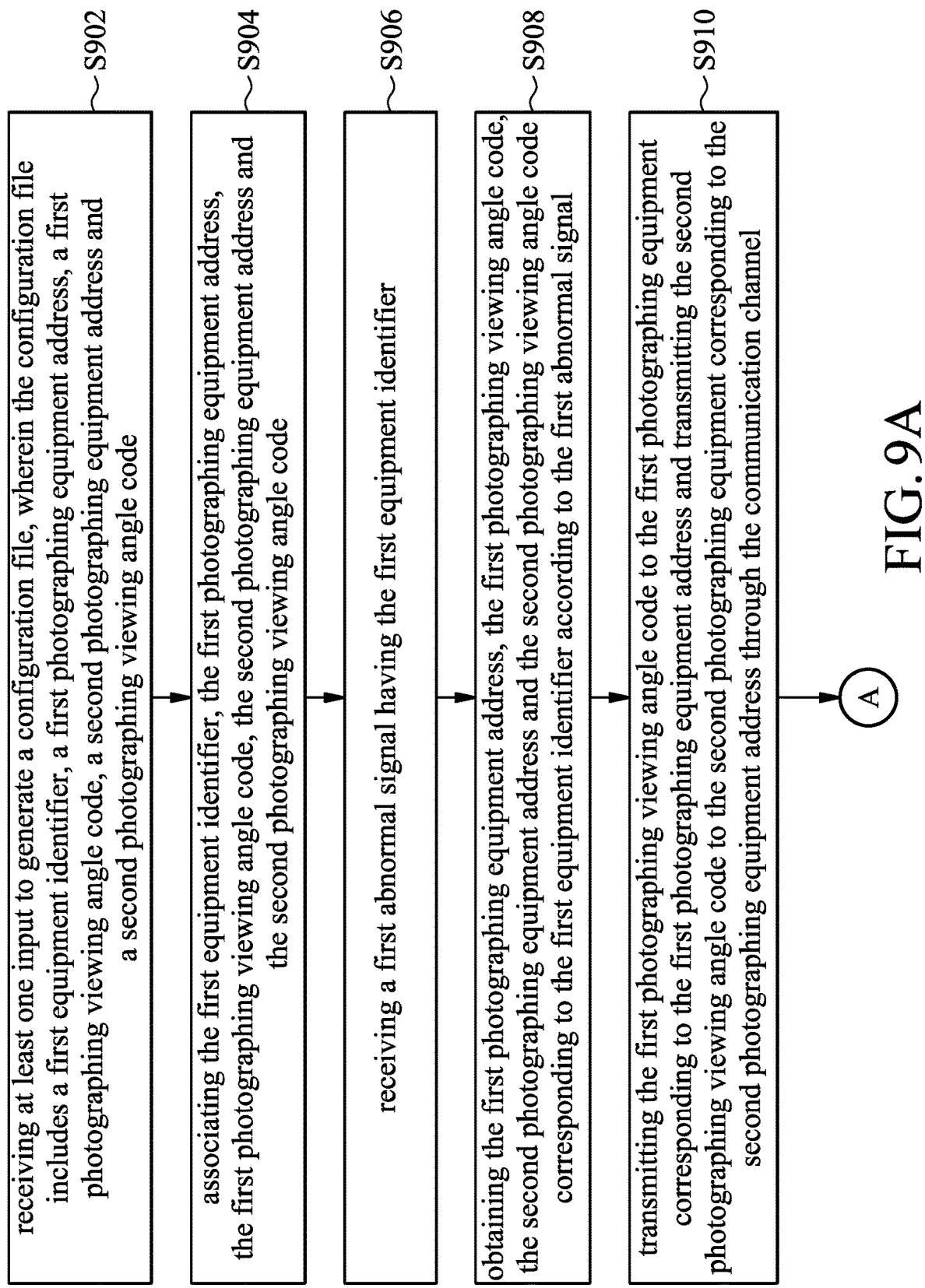
FIGS. 9A and 9B show a flowchart of a method for monitoring equipment state according to another embodiment of the present invention.
Figure 9B:
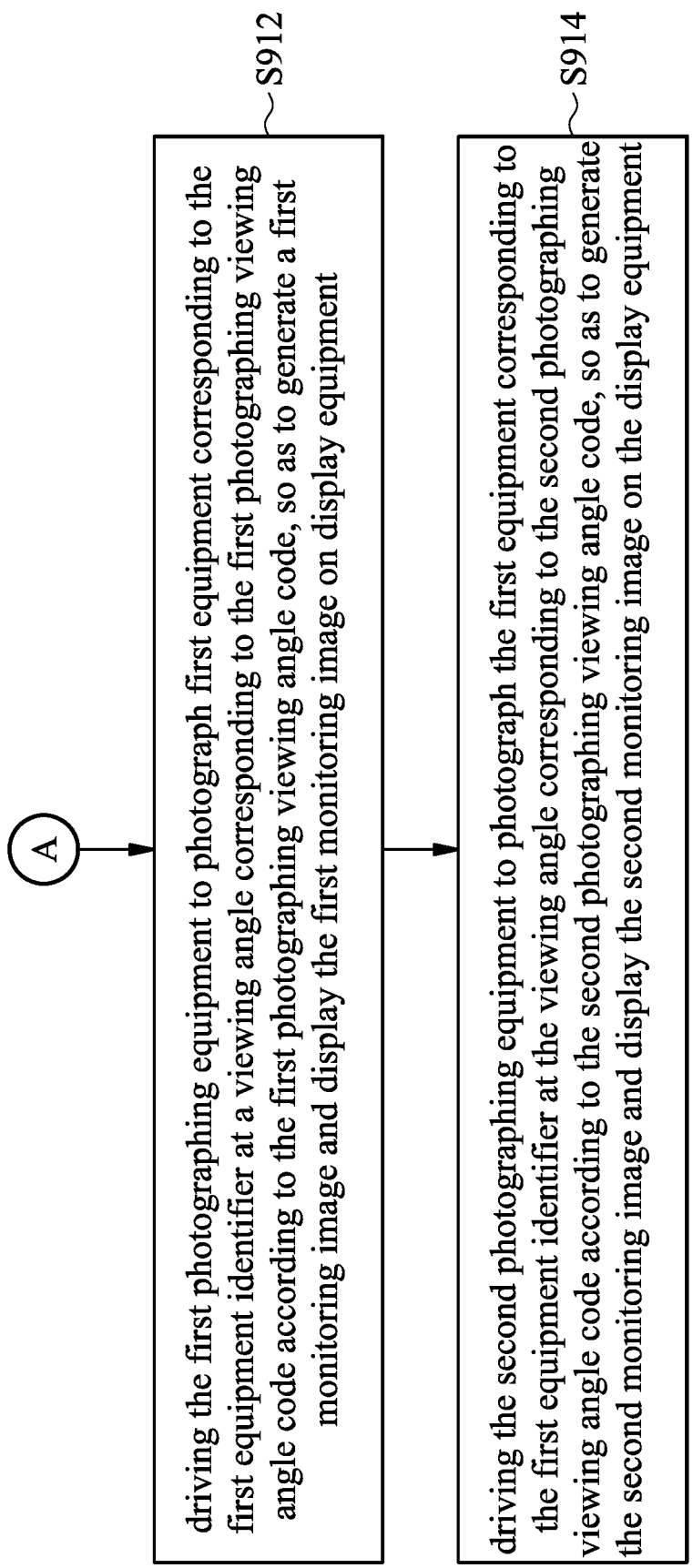

FIGS. 9A and 9B show a flowchart of a method for monitoring equipment state according to another embodiment of the present invention. The flowchart in FIGS. 9A and 9B corresponds to the system in FIG. 4. In step S902, the method involves receiving at least one input to generate a configuration file, wherein the configuration file includes a first equipment identifier, a first photographing equipment address, a first photographing viewing angle code, a second photographing equipment address and a second photographing viewing angle code.

In step S904, the method involves associating the first equipment identifier, the first photographing equipment address, the first photographing viewing angle code, the second photographing equipment address and the second photographing viewing angle code. In step S906, the method involves receiving a first abnormal signal having the first equipment identifier. In step S908, the method involves obtaining the first photographing equipment address, the first photographing viewing angle code, the second photographing equipment address and the second photographing viewing angle code corresponding to the first equipment identifier according to the first abnormal signal.

In step S910, the method involves transmitting the first photographing viewing angle code to the first photographing equipment corresponding to the first photographing equipment address and transmitting the second photographing viewing angle code to the second photographing equipment corresponding to the second photographing equipment address through the communication channel. In step S912, the method involves driving the first photographing equipment to photograph first equipment corresponding to the first equipment identifier at a viewing angle corresponding to the first photographing viewing angle code according to the first photographing viewing angle code, so as to generate a first monitoring image and display the first monitoring image on display equipment.

In step S914, the method involves driving the second photographing equipment to photograph the first equipment corresponding to the first equipment identifier at the viewing angle corresponding to the second photographing viewing angle code according to the second photographing viewing angle code, so as to generate the second monitoring image and display the second monitoring image on the display equipment. In the embodiment, displaying the first monitoring image and the second monitoring image on the display equipment in steps S912 and S914 includes displaying the first monitoring image and the second monitoring image on the display equipment at the same time or displaying the first monitoring image and the second monitoring image in turn on the display equipment. In the embodiment, the first abnormal signal is, for example generated by the first equipment. The first abnormal signal is, for example, generated by analyzing the first monitoring image. The first abnormal signal is, for example, generated by clicking the equipment icon corresponding to the first equipment on the user interface of the display equipment through the user.

Figure 10:
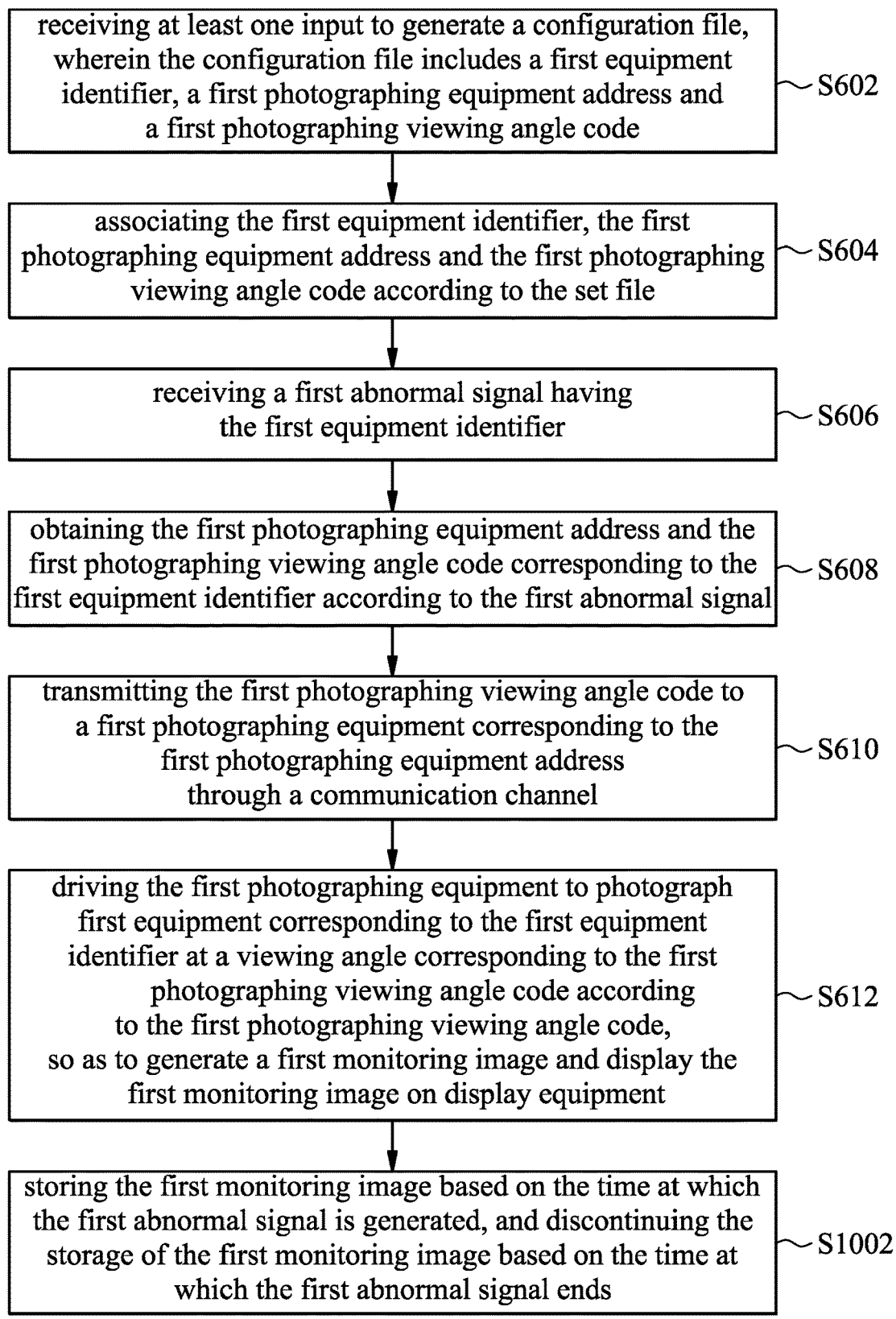
FIG. 10 shows a flowchart of a method for monitoring equipment state according to another embodiment of the present invention.

FIG. 10 shows a flowchart of a method for monitoring equipment state according to another embodiment of the present invention. The flowchart in FIG. 10 corresponds to the system in FIG. 1. In the embodiment, steps S602 to S612 in FIG. 10 are identical to that discussed in FIG. 6, these steps may refer to the description of the embodiment in FIG. 6 and the description thereof is not repeated herein.

In step S1002, the method involves storing the first monitoring image based on the time at which the first abnormal signal is generated, and discontinuing the storage of the first monitoring image based on the time at which the first abnormal signal ends. In the embodiment, the first abnormal signal is, for example generated by the first equipment. The first abnormal signal is, for example, generated by analyzing the first monitoring image. The first abnormal signal is, for example, generated by clicking the equipment icon corresponding to the first equipment on the user interface of the display equipment through the user.

Figure 11A:
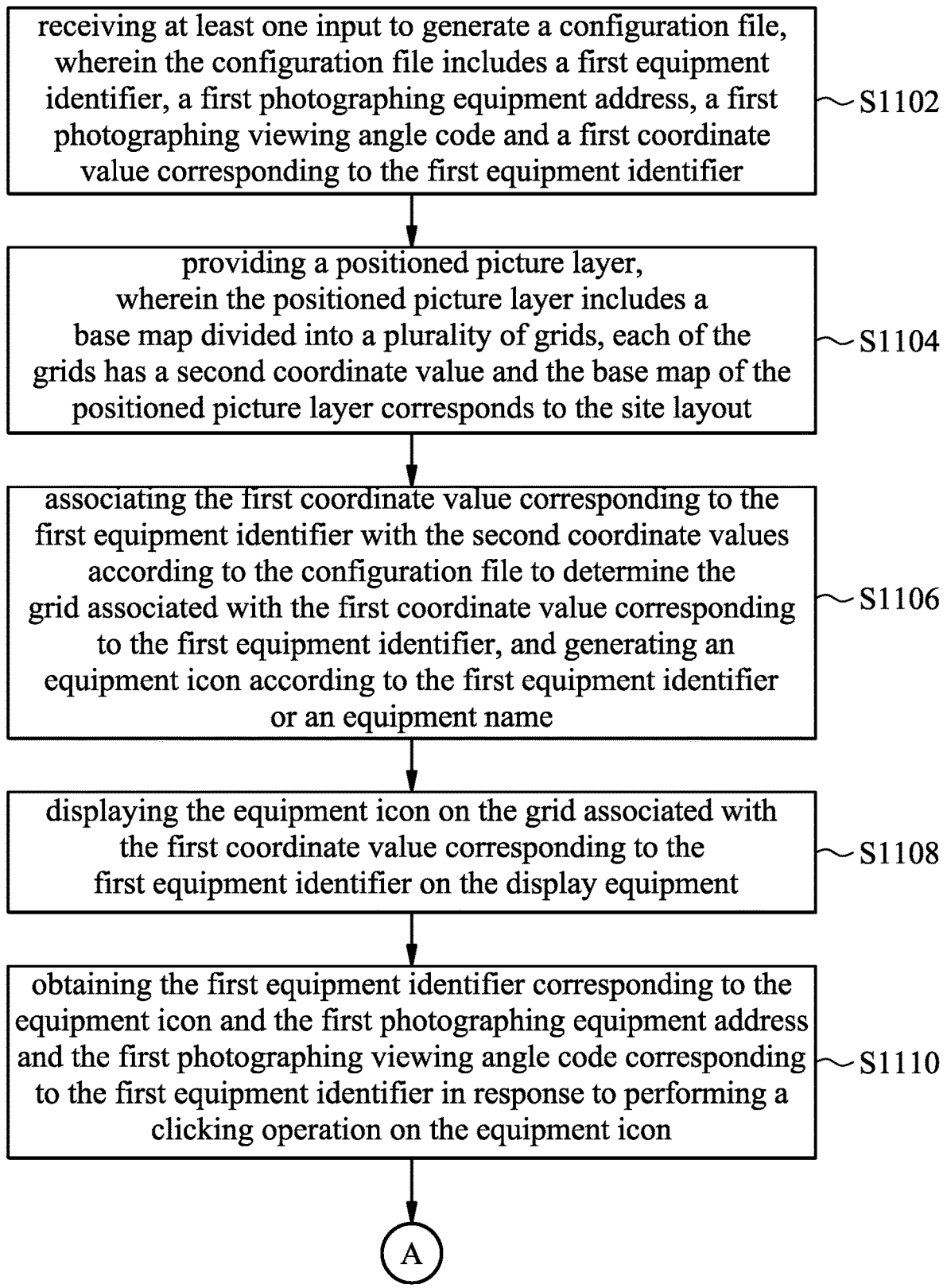
FIGS. 11A and 11B show a flowchart of a method for monitoring equipment state according to another embodiment of the present invention.
Figure 11B:
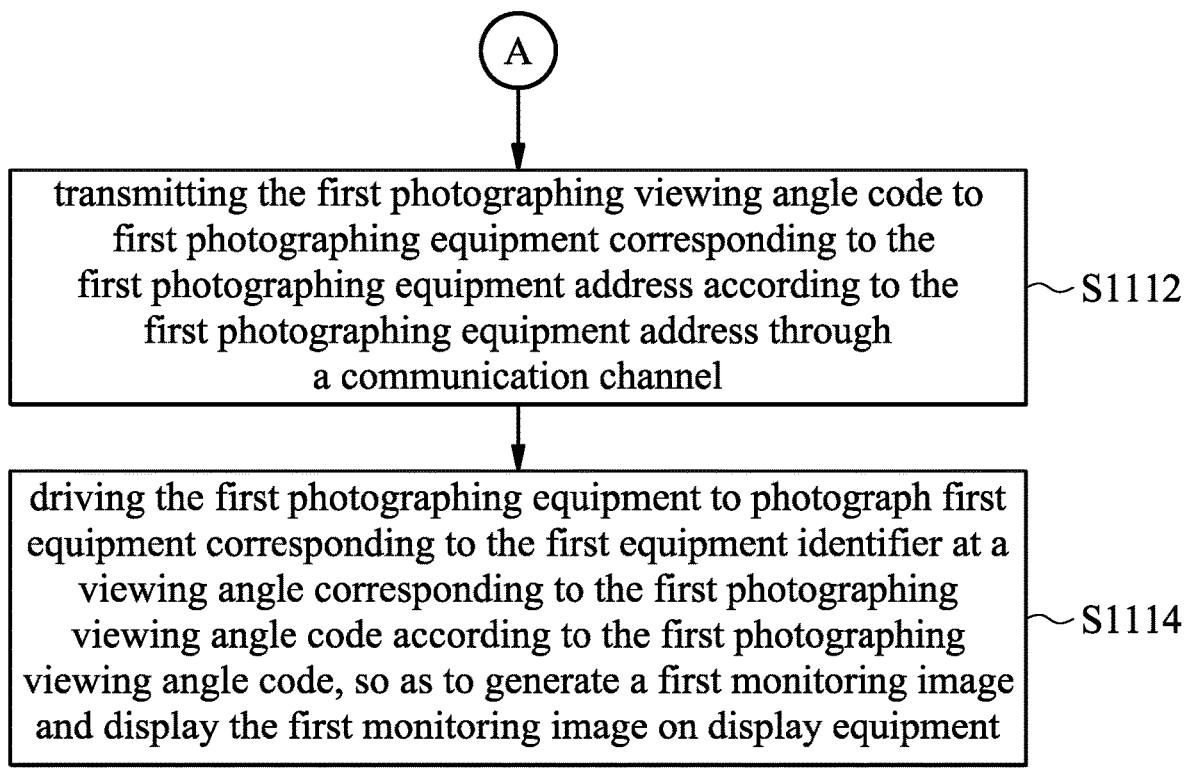

FIGS. 11A and 11B show a flowchart of a method for monitoring equipment state according to another embodiment of the present invention. The flowchart in FIGS. 11A and 11B corresponds to the system in FIG. 5. In step S1102, the method involves receiving at least one input to generate a configuration file, wherein the configuration file includes a first equipment identifier, a first photographing equipment address, a first photographing viewing angle code and a first coordinate value corresponding to the first equipment identifier. In step S1104, the method involves providing a positioned picture layer, wherein the positioned picture layer includes a base map divided into a plurality of grids, each of the grids has a second coordinate value and the base map of the positioned picture layer corresponds to the site layout.

In step S1106, the method involves associating the first coordinate value corresponding to the first equipment identifier with the second coordinate values according to the configuration file to determine the grid associated with the first coordinate value corresponding to the first equipment identifier, and generating an equipment icon according to the first equipment identifier or an equipment name. In step S1108, the method involves displaying the equipment icon on the grid associated with the first coordinate value corresponding to the first equipment identifier on the display equipment.

In step S1110, the method involves obtaining the first equipment identifier corresponding to the equipment icon and the first photographing equipment address and the first photographing viewing angle code corresponding to the first equipment identifier in response to performing a clicking operation on the equipment icon.

In step S1112, the method involves transmitting the first photographing viewing angle code to first photographing equipment corresponding to the first photographing equipment address according to the first photographing equipment address through a communication channel. In step S1114, the method involves driving the first photographing equipment to photograph first equipment corresponding to the first equipment identifier at a viewing angle corresponding to the first photographing viewing angle code according to the first photographing viewing angle code, so as to generate a first monitoring image and display the first monitoring image on display equipment.

In summary, according to the method and system for monitoring the equipment state, the equipment identifier, the photographing equipment address and the photographing viewing angle code are associated. When the abnormal signal having the equipment identifier is received, the photographing equipment address and the photographing viewing angle code corresponding to the equipment identifier are obtained according to the abnormal signal. The photographing viewing angle code is transmitted according to the photographing equipment address through the communication channel. Accordingly, the photographing equipment corresponding to the photographing equipment address photographs the equipment corresponding to the equipment identifier at the viewing angle corresponding to the photographing viewing angle code, so as to generate the monitoring image and display the monitoring image. Therefore, the effect of quickly finding the abnormality is achieved and the flexibility and timeliness of monitoring is increased.

In addition, in the embodiments of the present invention, one piece of photographing equipment may be configured to correspond to multiple pieces of equipment, or one piece of equipment may be configured to correspond to multiple pieces of photographing equipment, so as to increase the flexibility and timeliness of monitoring. Furthermore, the embodiments of the present invention may also generate the equipment icon, display the equipment icon on the gird of the positioned picture layer and replace or delete the position of the equipment icon, thereby increasing the flexibility and timeliness of monitoring.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for monitoring equipment state, comprising:
receiving at least one input to generate a configuration file, wherein the configuration file comprises a first equipment identifier, a first photographing equipment address and a first photographing viewing angle code that are associated;
determining whether a first abnormal signal having the first equipment identifier is received;
in response to the first abnormal signal being received, obtaining the first photographing equipment address and the first photographing viewing angle code associated with the first equipment identifier from the configuration file;
transmitting the first photographing viewing angle code to a first photographing equipment corresponding to the first photographing equipment address through a communication channel;
driving the first photographing equipment to photograph a first equipment corresponding to the first equipment identifier at a viewing angle corresponding to the first photographing viewing angle code to generate a first monitoring image and display the first monitoring image on a display equipment.

2. The method for monitoring equipment state as claimed in claim 1, wherein the configuration file further comprises a second equipment identifier and a second photographing viewing angle code that are associated with the first photographing equipment address, and the method further comprises:
    determining whether a second abnormal signal having the second equipment identifier is received;
    in response to the second abnormal signal being received, obtaining the first photographing equipment address and the second photographing viewing angle code associated with the second equipment identifier from the configuration file;
    transmitting the second photographing viewing angle code to the first photographing equipment corresponding to the first photographing equipment address through the communication channel; and
    driving the first photographing equipment to photograph a second equipment corresponding to the second equipment identifier at a viewing angle corresponding to the second photographing viewing angle code to generate a second monitoring image and display the second monitoring image on the display equipment.

3. The method for monitoring equipment state as claimed in claim 2, further comprising:
    determining whether the first abnormal signal and the second abnormal signal are received at the same time;
    in response to the first abnormal signal and the second abnormal signal being received at the same time, respectively obtaining the first photographing equipment address and the first photographing viewing angle code associated with the first equipment identifier from the configuration file and the first photographing equipment address and the second photographing viewing angle code associated with the second equipment identifier form the configuration file;
    transmitting the first photographing viewing angle code and the second photographing viewing angle code to the first photographing equipment corresponding to the first photographing equipment address through the communication channel;
    respectively driving the first photographing equipment to photograph the first equipment corresponding to the first equipment identifier at the viewing angle corresponding to the first photographing viewing angle code to generate the first monitoring image, and driving the first photographing equipment to photograph the second equipment corresponding to the second equipment identifier at the viewing angle corresponding to the second photographing viewing angle code to generate the second monitoring image, wherein the first monitoring image and the second monitoring image are displayed in turn or simultaneously on the display equipment accordingly.

4. The method for monitoring equipment state as claimed in claim 1, wherein the configuration file further comprises a second photographing equipment address and a second photographing viewing angle code that are associated with the first equipment identifier, and the method for monitoring the equipment state further comprises:
    in response to the first abnormal signal being received, obtaining the second photographing equipment address and the second photographing viewing angle code associated with the first equipment identifier;
    transmitting the second photographing viewing angle code to a second photographing equipment corresponding to the second photographing equipment address through the communication channel; and
    driving the second photographing equipment to photograph the first equipment corresponding to the first equipment identifier at the viewing angle corresponding to the second photographing viewing angle code to generate the second monitoring image and display the second monitoring image on the display equipment.

5. The method for monitoring equipment state as claimed in claim 4, wherein the step of displaying the first monitoring image and the second monitoring image on the display equipment comprises displaying the first monitoring image and the second monitoring image on the display equipment at the same time or displaying the first monitoring image and the second monitoring image in turn on the display equipment.

6. The method for monitoring equipment state as claimed in claim 1, further comprising:
    storing the first monitoring image based on a time at which the first abnormal signal is generated, and discontinuing the storage of the first monitoring image based on a time at which the first abnormal signal ends.

7. The method for monitoring equipment state as claimed in claim 1, wherein the first abnormal signal is generated by the first equipment, analyzing the first monitoring image, or a user interface operated on the display equipment.

8. The method for monitoring equipment state as claimed in claim 1, further comprising:
    displaying an equipment icon on the display equipment;
    in response to performing a clicking operation on the equipment icon, obtaining the first equipment identifier corresponding to the equipment icon and the first photographing equipment address and the first photographing viewing angle code associated with the first equipment identifier; and
    performing the step of transmitting the first photographing viewing angle code to the first photographing equipment corresponding to the first photographing equipment address through the communication channel.

9. The method for monitoring equipment state as claimed in claim 8, wherein the configuration file further comprises a first coordinate value corresponding to the first equipment identifier, and the method further comprises:
    providing a positioned picture layer, wherein the positioned picture layer comprises a base map divided into a plurality of grids, each of the grids has a second coordinate value and the base map of the positioned picture layer corresponds to a site layout;
    associating the first coordinate value corresponding to the first equipment identifier with the second coordinate values according to the configuration file to determine the grid associated with the first coordinate value corresponding to the first equipment identifier, and generating the equipment icon according to the first equipment identifier or an equipment name; and
    displaying the equipment icon on the grid associated with the first coordinate value corresponding to the first equipment identifier on the display equipment.

10. A system for monitoring equipment state, comprising:
    a setting equipment, configured to receive at least one input to generate a configuration file, wherein the configuration file comprises a first equipment identifier, a first photographing equipment address and a first photographing viewing angle code that are associated;
    a processor, configured to determine whether a first abnormal signal having the first equipment identifier is received, and in response to the first abnormal signal being received, obtain the first photographing equipment address and the first photographing viewing angle code associated with the first equipment identifier from the configuration file;

communication equipment, configured to transmit the first photographing viewing angle code according to the first photographing equipment address through a communication channel; and first photographing equipment, corresponding to the first photographing equipment address, and configured to
receive the first photographing viewing angle code,
drive the first photographing equipment to photograph a first equipment corresponding to the first equipment identifier at a viewing angle corresponding to the first photographing viewing angle code to generate a first monitoring image; and
display the first monitoring image on a display equipment.

11. The system for monitoring equipment state as claimed in claim 10, wherein the configuration file further comprises a second equipment identifier and a second photographing viewing angle code that are associated with the first photographing equipment address;

wherein the processor further determines whether a second abnormal signal having the second equipment identifier is received;

wherein the processor further in response to the second abnormal signal being received, obtains the first photographing equipment address and the second photographing viewing angle code associated with the second equipment identifier from the configuration file, and transmits the second photographing viewing angle code to the first photographing equipment corresponding to the first photographing equipment address through the communication channel;

wherein the first photographing equipment is further driven to photograph a second equipment corresponding to the second equipment identifier at a viewing angle corresponding to the second photographing viewing angle code to generate a second monitoring image and display the second monitoring image on the display equipment.

12. The system for monitoring equipment state as claimed in claim 11, wherein the processor further determines whether the first abnormal signal and/or the second abnormal signal are received at the same time;

wherein the processor in response to the first abnormal signal and the second abnormal signal being received at the same time, respectively obtains the first photographing equipment address and the first photographing viewing angle code associated with the first equipment identifier from the configuration file and the first photographing equipment address and the second photographing viewing angle code associated with the second equipment identifier form the configuration file;

wherein the processor transmits the first photographing viewing angle code and the second photographing viewing angle code to the first photographing equipment corresponding to the first photographing equipment address through the communication channel;

wherein the first photographing equipment is driven to photograph the first equipment corresponding to the first equipment identifier at the viewing angle corresponding to the first photographing viewing angle code to generate the first monitoring image;

wherein the first photographing equipment is driven to photograph the second equipment corresponding to the second equipment identifier at the viewing angle corresponding to the second photographing viewing angle code to generate the second monitoring image;

wherein the first monitoring image and the second monitoring image are further displayed in turn or simultaneously on the display equipment accordingly.

13. The system for monitoring equipment state as claimed in claim 10, further comprising:

second photographing equipment, corresponding to the first photographing equipment address;

wherein the configuration file further comprises a second photographing equipment address and a second photographing viewing angle code that are associated with the first equipment identifier;

wherein the processor in response to the first abnormal signal being received, obtains the first photographing equipment address, the first photographing viewing angle code, the second photographing equipment address and the second photographing viewing angle code associated with the first equipment identifier;

wherein the processor respectively transmits the first photographing viewing angle code and the second photographing viewing angle code to the first photographing equipment and the second photographing equipment according to the first photographing equipment address and the second photographing equipment address through the communication channel;

wherein the first photographing equipment is driven to photograph the first equipment corresponding to the first equipment identifier at the viewing angle corresponding to the first photographing viewing angle code to generate the first monitoring image and display the first monitoring image on the display equipment;

wherein the second photographing equipment is driven to photograph the first equipment corresponding to the first equipment identifier at the viewing angle corresponding to the second photographing viewing angle code to generate the second monitoring image, so that the processor obtains the second monitoring image through the communication channel and displays the second monitoring image on the display equipment.

14. The system for monitoring equipment state as claimed in claim 13, wherein the first monitoring image and the second monitoring image are displayed on display equipment at the same time or the first monitoring image and the second monitoring image are displayed in turn on the display equipment.

15. The system for monitoring equipment state as claimed in claim 10, wherein the processor stores the first monitoring image based on a time at which the first abnormal signal is generated, and the processor discontinues the storage of the first monitoring image based on a time at which the first abnormal signal ends.

16. The system for monitoring equipment state as claimed in claim 10, wherein the first abnormal signal is generated by the first equipment, analyzing the first monitoring image, or a user interface operated on the display equipment.

17. The system for monitoring equipment state as claimed in claim 10, wherein an equipment icon is displayed on the display equipment, in response to performing a clicking operation on the equipment icon, the processor further obtains the first equipment identifier corresponding to the equipment icon and the first photographing equipment address and the first photographing viewing angle code corresponding to the first equipment identifier, and the first photographing viewing angle code is transmitted according to the first photographing equipment address through the communication channel;

wherein the first photographing equipment directly photographs the first equipment corresponding to the first equipment identifier or turns to a viewing angle corresponding to the first photographing viewing angle code to photograph the first equipment to generate the first monitoring image and display the first monitoring image on the display equipment.

18. The system for monitoring equipment state as claimed in claim 17, wherein the configuration file further comprises a first coordinate value corresponding to the first equipment identifier, and the system further comprises:
- a picture layer generator, configured to provide a positioned picture layer, wherein the positioned picture layer comprises a base map divided into a plurality of grids, each of the grids has a second coordinate value and the base map of the positioned picture layer corresponds to a site layout;
- wherein the processor associates the first coordinate value corresponding to the first equipment identifier with the second coordinate values according to the configuration file to determine the grid associated with the first coordinate value corresponding to the first equipment identifier, and generates the equipment icon according to the first equipment identifier or an equipment name; and
- wherein the equipment icon is displayed on the grid associated with the first coordinate value corresponding to the first equipment identifier on the display equipment.

* * * * *